United States Patent
Meir et al.

(10) Patent No.: US 12,191,899 B2
(45) Date of Patent: Jan. 7, 2025

(54) HIGH ORDER DIGITAL POST-DISTORTION PROCEDURES

(71) Applicant: QUALCOMM Incorporated, San Diego, CA (US)

(72) Inventors: Elad Meir, Ramat Gan (IL); Gideon Shlomo Kutz, Ramat Hasharon (IL); Yaron Laufer, Brookline, MA (US)

(73) Assignee: QUALCOMM Incorporated, San Diego, CA (US)

( * ) Notice: Subject to any disclaimer, the term of this patent is extended or adjusted under 35 U.S.C. 154(b) by 441 days.

(21) Appl. No.: 17/526,821

(22) Filed: Nov. 15, 2021

(65) Prior Publication Data

US 2023/0155617 A1     May 18, 2023

(51) Int. Cl.
| | | |
|---|---|---|
| H04B 1/10 | (2006.01) | |
| H04L 5/00 | (2006.01) | |
| H04L 25/02 | (2006.01) | |
| H04L 25/03 | (2006.01) | |

(52) U.S. Cl.
CPC ......... *H04B 1/1027* (2013.01); *H04L 5/0048* (2013.01); *H04L 25/0224* (2013.01); *H04L 25/03019* (2013.01)

(58) Field of Classification Search
CPC . H04B 1/1027; H04L 5/0048; H04L 25/0224; H04L 25/03019
See application file for complete search history.

(56) References Cited

U.S. PATENT DOCUMENTS

| | | | | |
|---|---|---|---|---|
| 10,305,435 | B1 * | 5/2019 | Murugesu | ............... H03F 3/189 |
| 2004/0196921 | A1 * | 10/2004 | Matsumoto | ........... H04B 1/123 |
| | | | | 375/285 |
| 2009/0316826 | A1 * | 12/2009 | Koren | .................. H04L 27/366 |
| | | | | 375/296 |
| 2015/0155837 | A1 * | 6/2015 | Lozhkin | .................... H03F 3/19 |
| | | | | 330/149 |
| 2022/0393734 | A1 * | 12/2022 | Laufer | ................. H04B 17/382 |

FOREIGN PATENT DOCUMENTS

| | | | | |
|---|---|---|---|---|
| WO | WO-2012013218 A1 | * | 2/2012 | .......... H03F 1/3247 |
| WO | WO-2023083453 A1 | * | 5/2023 | |

OTHER PUBLICATIONS

On Digital Post-Distortion Techniques—IEEE Transactions on Signal Processing: vol. 64 Issue 3, Feb. 1, 2016 (Year: 2016).*
On Digital Post-Distortion Techniques—IEEE Transactions on Signal Processing: vol. 64 Issue 3 (Year: 2016).*

* cited by examiner

*Primary Examiner* — Charles C Jiang
*Assistant Examiner* — Rachel Elizabeth Marks
(74) *Attorney, Agent, or Firm* — Holland & Hart LLP

(57) ABSTRACT

Methods, systems, and devices for wireless communications are described. Generally, a base station may indicate, to a user equipment (UE), when it changes a power amplifier (PA) non-linearity model. The base station may transmit a set of parameters for the PA model, and a set of parameters for a non-linear equalizer function for the UE to use during a digital post-processing procedure (DPoD). The base station may indicate, to the UE, a lookup table, a vector of lookup tales, a set of kernels (e.g., from which the UE may estimate the coefficients of the PA model), or a set of both the kernels and the coefficients for the PA model. Similarly, for the non-linear equalizer function, the base station may indicate an explicit indication of the function, or may indicate a lookup table, or a kernels series (e.g., with or without corresponding coefficients).

31 Claims, 16 Drawing Sheets

HIGH ORDER DIGITAL POST-DISTORTION PROCEDURES

FIELD OF TECHNOLOGY

The present disclosure relates to wireless communications, including high order digital post-distortion procedures.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support high order digital post-distortion procedures. Generally, a receiving device (e.g., a user equipment (UE)), may perform higher-order modeling (e.g., a Bussgang Reconstruction) for orthogonal frequency division multiplexing (OFDM) digital post-distortion (DPoD) procedures. The base station may indicate, to the UE, when it changes a PA non-linearity model. Such changes may occur based on temperature variation, beam changes, etc. If the model is changed, the UE may update the PA model used for nonlinear distortion estimation, and a non-linear equalizer function ($f$), which may be used at the equalization stage of the DPoD procedure.

The base station may transmit a set of parameters for the PA model, and a set of parameters for the non-linear equalizer function. The base station may indicate, to the UE, a lookup table, a vector of lookup tales, a set of kernels (e.g., from which the UE may estimate the coefficients of the PA model), or a set of both the kernels and the coefficients for the PA model. Similarly, for the equalizer function, the base station may indicate an explicit indication of the function, or may indicate a lookup table, or a kernels series (e.g., with or without corresponding coefficients). Based on this information, the UE may update a PA model and a non-linear equalizer function, quickly and efficiently estimate a distortion component of a received data signal, removes the distortion component, and decode the baseband signal without the distortion. This may allow for the base station to transmit using the high power amplifiers (HPAs) without violating any error vector magnitude (EVM) limitations, and without applying a BO resulting in low transmit power and inefficient wireless communications. As a result, techniques described herein may result in improved reliability of wireless communications, decreased system delays and latency, and improved user experience.

A method for wireless communications at a user equipment (UE) is described. The method may include receiving, from a base station, a first set of parameters corresponding to a PA model associated with downlink signaling and a second set of parameters corresponding to a non-linear equalizer function, performing a DPoD procedure on a downlink signal based on the PA model and the non-linear equalizer function, removing a distortion element associated with the downlink signal based on the DPoD procedure, and decoding the downlink signal subsequent to removing the distortion element associated with the downlink signal.

An apparatus for wireless communications at a UE is described. The apparatus may include a processor, memory coupled with the processor, and instructions stored in the memory. The instructions may be executable by the processor to cause the apparatus to receive, from a base station, a first set of parameters corresponding to a PA model associated with downlink signaling and a second set of parameters corresponding to a non-linear equalizer function, perform a DPoD procedure on a downlink signal based on the PA model and the non-linear equalizer function, remove a distortion element associated with the downlink signal based on the DPoD procedure, and decode the downlink signal subsequent to removing the distortion element associated with the downlink signal.

Another apparatus for wireless communications at a UE is described. The apparatus may include means for receiving, from a base station, a first set of parameters corresponding to a PA model associated with downlink signaling and a second set of parameters corresponding to a non-linear equalizer function, means for performing a DPoD procedure on a downlink signal based on the PA model and the non-linear equalizer function, means for removing a distortion element associated with the downlink signal based on the DPoD procedure, and means for decoding the downlink signal subsequent to removing the distortion element associated with the downlink signal.

A non-transitory computer-readable medium storing code for wireless communications at a UE is described. The code may include instructions executable by a processor to receive, from a base station, a first set of parameters corresponding to a PA model associated with downlink signaling and a second set of parameters corresponding to a non-linear equalizer function, perform a DPoD procedure on a downlink signal based on the PA model and the non-linear equalizer function, remove a distortion element associated with the downlink signal based on the DPoD procedure, and decode the downlink signal subsequent to removing the distortion element associated with the downlink signal.

In some examples of the method, apparatuses, and non-transitory computer-readable medium described herein, receiving the first set of parameters corresponding to the PA model may include operations, features, means, or instructions for receiving an indication of the PA model used by the base station to transmit the downlink signal.

In some examples of the method, apparatuses, and non-transitory computer-readable medium described herein, receiving the first set of parameters corresponding to the PA model may include operations, features, means, or instructions for receiving an indication of a set of kernels for the PA model.

Some examples of the method, apparatuses, and non-transitory computer-readable medium described herein may further include operations, features, means, or instructions for receiving, from the base station, a set of pilot signals allocated for estimating PA model s, non-linear equalizer functions, or both and estimating a set of coefficients for the PA model based on receiving the set of pilot signals and the set of kernels.

In some examples of the method, apparatuses, and non-transitory computer-readable medium described herein, receiving the first set of parameters corresponding to the PA model may include operations, features, means, or instructions for receiving an indication of a set of kernels for the PA model and a set of coefficients for the PA model.

In some examples of the method, apparatuses, and non-transitory computer-readable medium described herein, receiving the first set of parameters corresponding to the PA model may include operations, features, means, or instructions for receiving an indication of a vector of lookup tables including an indication of the PA model.

In some examples of the method, apparatuses, and non-transitory computer-readable medium described herein, receiving the second set of parameters corresponding to the non-linear equalizer function may include operations, features, means, or instructions for receiving an indication of a model for the non-linear equalizer function.

In some examples of the method, apparatuses, and non-transitory computer-readable medium described herein, receiving the second set of parameters corresponding to the non-linear equalizer function may include operations, features, means, or instructions for receiving an indication of a set of kernels for the non-linear equalizer function.

Some examples of the method, apparatuses, and non-transitory computer-readable medium described herein may further include operations, features, means, or instructions for receiving, from the base station, a set of pilot signals allocated for estimating PA models, non-linear equalizer functions, or both and estimating a set of coefficients for the non-linear equalizer function based on receiving the set of pilot signals and the set of kernels.

In some examples of the method, apparatuses, and non-transitory computer-readable medium described herein, receiving the second set of parameters corresponding to the non-linear equalizer function may include operations, features, means, or instructions for receiving an indication of a set of kernels for the non-linear equalizer function and a set of coefficients for the non-linear equalizer function.

Some examples of the method, apparatuses, and non-transitory computer-readable medium described herein may further include operations, features, means, or instructions for transmitting, to the base station, a request for the first set of parameters, the second set of parameters, or both, where receiving the first set of parameters and the second set of parameters may be based on transmitting the request.

Some examples of the method, apparatuses, and non-transitory computer-readable medium described herein may further include operations, features, means, or instructions for receiving, from the base station, higher layer signaling including a lookup table associating a set of indices with respective parameters corresponding to the PA model, respective parameters corresponding to the non-linear equalizer function, or both.

In some examples of the method, apparatuses, and non-transitory computer-readable medium described herein, receiving the first set of parameters corresponding to the PA model associated with downlink signaling and the second set of parameters corresponding to the non-linear equalizer function may include operations, features, means, or instructions for receiving an index of the set of indices identifying the first set of parameters corresponding to the PA model associated with downlink signaling, the second set of parameters corresponding to a non-linear equalizer function, or both, via the lookup table.

A method for wireless communications at a base station is described. The method may include selecting a PA model associated with downlink signaling according to a first set of parameters associated with the PA model, transmitting, to a UE, the first set of parameters and a second set of parameters corresponding to a non-linear equalizer function corresponding to the PA model, and transmitting, to the UE, a downlink signal according to the PA model.

An apparatus for wireless communications at a base station is described. The apparatus may include a processor, memory coupled with the processor, and instructions stored in the memory. The instructions may be executable by the processor to cause the apparatus to select a PA model associated with downlink signaling according to a first set of parameters associated with the PA model, transmit, to a UE, the first set of parameters and a second set of parameters corresponding to a non-linear equalizer function corresponding to the PA model, and transmit, to the UE, a downlink signal according to the PA model.

Another apparatus for wireless communications at a base station is described. The apparatus may include means for selecting a PA model associated with downlink signaling according to a first set of parameters associated with the PA model, means for transmitting, to a UE, the first set of parameters and a second set of parameters corresponding to a non-linear equalizer function corresponding to the PA model, and means for transmitting, to the UE, a downlink signal according to the PA model.

A non-transitory computer-readable medium storing code for wireless communications at a base station is described. The code may include instructions executable by a processor to select a PA model associated with downlink signaling according to a first set of parameters associated with the PA model, transmit, to a UE, the first set of parameters and a second set of parameters corresponding to a non-linear equalizer function corresponding to the PA model, and transmit, to the UE, a downlink signal according to the PA model.

In some examples of the method, apparatuses, and non-transitory computer-readable medium described herein, transmitting the first set of parameters corresponding to the PA model may include operations, features, means, or instructions for transmitting an indication of the PA model used by the base station to transmit the downlink signal.

In some examples of the method, apparatuses, and non-transitory computer-readable medium described herein, transmitting the first set of parameters corresponding to the PA model may include operations, features, means, or instructions for transmitting an indication of a set of kernels for the PA model.

In some examples of the method, apparatuses, and non-transitory computer-readable medium described herein, transmitting the first set of parameters corresponding to the PA model may include operations, features, means, or instructions for transmitting an indication of a set of kernels for the PA model and a set of coefficients for the PA model.

In some examples of the method, apparatuses, and non-transitory computer-readable medium described herein, transmitting the first set of parameters corresponding to the PA model may include operations, features, means, or instructions for transmitting an indication of a vector of lookup tables including an indication of the PA model.

Some examples of the method, apparatuses, and non-transitory computer-readable medium described herein may further include operations, features, means, or instructions for transmitting, to the UE, a set of pilot signals allocated for estimating PA models, non-linear equalizer functions, or both.

In some examples of the method, apparatuses, and non-transitory computer-readable medium described herein, transmitting the second set of parameters corresponding to the non-linear equalizer function may include operations, features, means, or instructions for transmitting an indication of a model for the non-linear equalizer function.

In some examples of the method, apparatuses, and non-transitory computer-readable medium described herein, transmitting the second set of parameters corresponding to the non-linear equalizer function may include operations, features, means, or instructions for transmitting an indication of a set of kernels for the non-linear equalizer function.

In some examples of the method, apparatuses, and non-transitory computer-readable medium described herein, transmitting the second set of parameters corresponding to the non-linear equalizer function may include operations, features, means, or instructions for transmitting an indication of a set of kernels for the non-linear equalizer function and a set of coefficients for the non-linear equalizer function.

Some examples of the method, apparatuses, and non-transitory computer-readable medium described herein may further include operations, features, means, or instructions for receiving, from the UE, a request for the first set of parameters corresponding to the PA model associated with downlink signaling, the second set of parameters corresponding to a non-linear equalizer function, or both, where transmitting the first set of parameters and the second set of parameters may be based on receiving the request.

Some examples of the method, apparatuses, and non-transitory computer-readable medium described herein may further include operations, features, means, or instructions for transmitting, to the UE, higher layer signaling including a lookup table associating a set of indices with respective parameters corresponding to the PA model, parameters corresponding to a non-linear equalizer function, or both.

In some examples of the method, apparatuses, and non-transitory computer-readable medium described herein, transmitting the first set of parameters corresponding to the PA model associated with downlink signaling and the second set of parameters corresponding to the non-linear equalizer function may include operations, features, means, or instructions for transmitting an index of the set of indices identifying the first set of parameters corresponding to the PA model associated with downlink signaling, the second set of parameters corresponding to a non-linear equalizer function, or both, via the lookup table.

In some examples of the method, apparatuses, and non-transitory computer-readable medium described herein, selecting the PA model may include operations, features, means, or instructions for detecting a change in temperature, a beam change, or both and switching from a previous PA model to the PA model based on the detecting.

DETAILED DESCRIPTION

Figure 1:
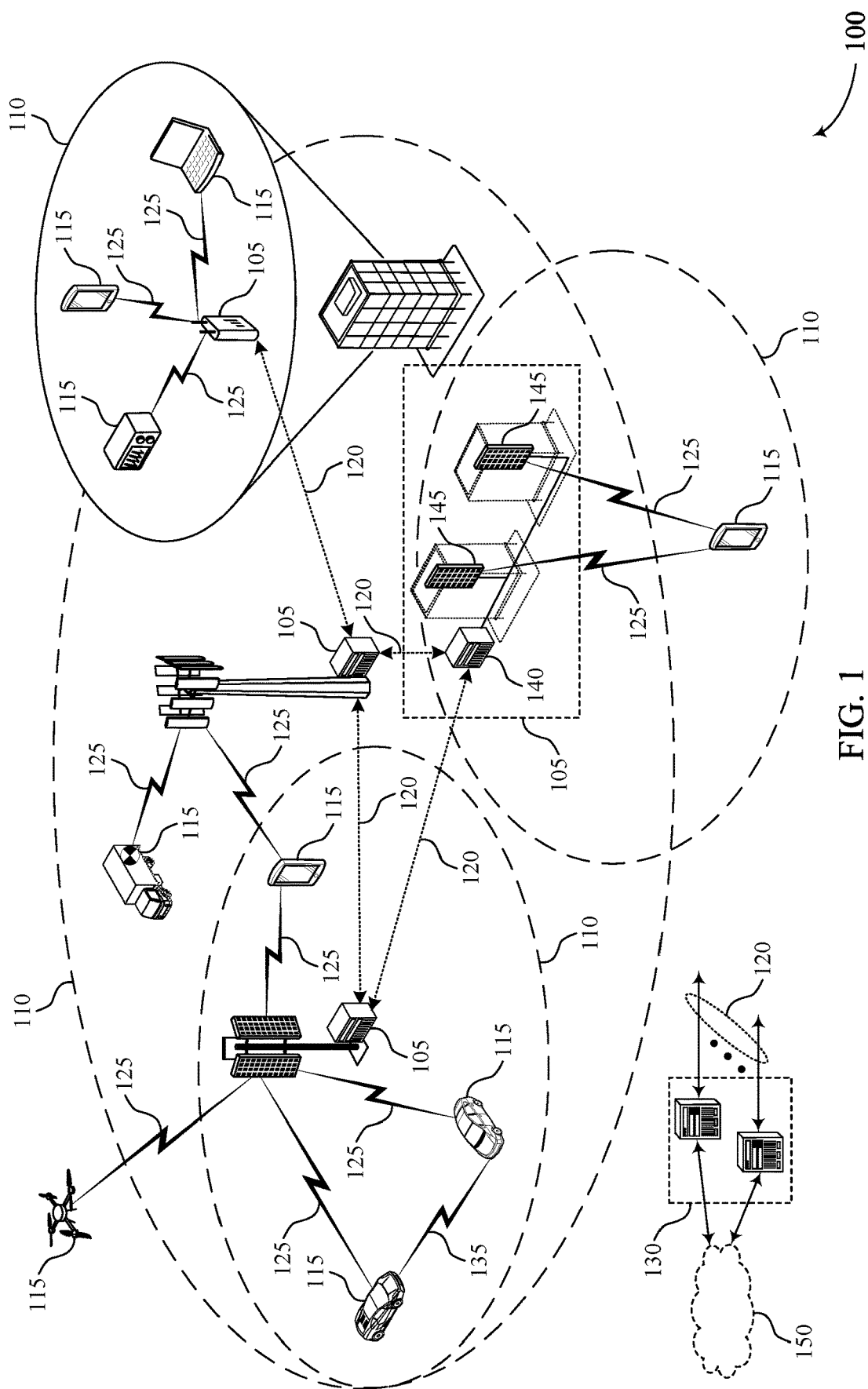
FIG. 1 illustrates an example of a wireless communications system that supports high order digital post-distortion (DPoD) procedures in accordance with aspects of the present disclosure.

Wireless communications systems may support communications between wireless devices. A transmitting device, such as a base station (e.g., using a high power amplifier (HPA) with a limited linear dynamic range) may generate downlink signaling with nonlinear components. Nonlinear components may distort a transmitted signal. To avoid such distortions, a power back-off (BO) may be introduced. However, a power BO may result in poor efficiency due to insufficient transmit power, which may result in poor reception of a transmission. To avoid transmissions with distorted signals and excessive power BOs, a wireless communications system may support digital post-Distortion (DPoD) procedures.

DPoD procedures may be implemented by a receiving device (e.g., a UE) to reduce or mitigate distortion to some target level. DPoD procedures may be referred to as post-PA equalizers, and may clean a signal by removing non-linearities from the signal. A non-linear equalizer, such as a DPoD, may be used to reduce HPA non-linearity effects. A DPoD procedure may include multiple iterations. In each iteration, a UE attempts to map a received signal to a constellation, produces an estimation of the received signal, puts the estimation through a slicer, identifies a distortion component of the of the received signal, and subtracts the distortion component from the non-linearity distorted signal to restore the non-distorted data signal. The UE performs as many iterations as is necessary to generate a non-distorted data signal, and then receives and decodes the baseband signal. However, in some examples, by implementing a lower order function at the DPoD, the initially identified distortion component may be large, and the UE may perform a high number of iterations of the DPoD procedure to accurately identify and remove the distortion component from the data signal. Such a high number of iterations may result in increased power expenditures at the UE, increased delays and latency, and decreased user experience.

In some examples, a receiving device (e.g., a UE), may perform higher-order modeling (e.g., a Bussgang Reconstruction) for orthogonal frequency division multiplexing (OFDM) DPoD procedures. Approximating a nonlinear output of a power amplifier (PA) model, and utilizing higher order functions for the DPoD procedure at the UE, may result in more accurately, and more quickly, identifying and subtracting the distortion component from the data signal (e.g., in less iterations than a lower order PA model and non-linear equalizer function). However, to effectively utilize such higher order PA models and non-linear equalizer functions, the UE may rely on information signaled from the base station regarding the model and the equalizer function.

The base station may indicate, to the UE, when it changes a PA non-linearity model. Such changes may occur based on temperature variation, beam changes, etc. If the model is changed, the UE may update the PA model used for non-linear distortion estimation, and a non-linear equalizer function ($f$), which may be used at the equalization stage of the DPoD procedure. The base station may transmit a set of parameters for the PA model, and a set of parameters for the non-linear equalizer function ($f$). The base station may indicate, to the UE, a lookup table, a vector of lookup tales, a set of kernels (e.g., from which the UE may estimate the coefficients of the PA model), or a set of both the kernels and the coefficients for the PA model. Similarly, for the equalizer function, the base station may indicate an explicit indication of the function, or may indicate a lookup table, or a kernels series (e.g., with or without corresponding coefficients). Based on this information, the UE may update a PA model and a non-linear equalizer function, quickly and efficiently estimate a distortion component of a received data signal, removes the distortion component, and decode the baseband signal without the distortion. This may allow for the base station to transmit using the HPAs without violating any error vector magnitude (EVM) limitations, and without applying a BO resulting in low transmit power and inefficient wireless communications. As a result, techniques described herein may result in improved reliability of wireless communications, decreased system delays and latency, and improved user experience.

Aspects of the disclosure are initially described in the context of wireless communications systems. Aspects of the disclosure are further illustrated by and described with reference to wireless communications systems, power amplification scenarios, and process flows. Aspects of the disclosure are further illustrated by and described with reference to apparatus diagrams, system diagrams, and flowcharts that relate to high order DPoD procedures.

FIG. 1 illustrates an example of a wireless communications system 100 that supports high order DPoD procedures in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a receiving device (e.g., a UE 115), may perform higher-order modeling (e.g., a Bussgang Reconstruction) for orthogonal frequency division multiplexing (OFDM) DPoD procedures. Approximating a nonlinear output of a power amplifier (PA) model, and utilizing higher order functions for the DPoD procedure at the UE 115, may result in more accurately, and more quickly, identifying and subtracting the distortion component from the data signal (e.g., in less iterations than a lower order PA model and non-linear equalizer function). However, to effectively utilize such higher order PA models and non-linear equalizer functions, the UE 115 may rely on information signaled from the base station 105 regarding the model and the equalizer function.

The base station 105 may indicate, to the UE 115, when it changes a PA non-linearity model. Such changes may occur based on temperature variation, beam changes, etc. If the model is changed, the UE 115 may update the PA model used for nonlinear distortion estimation, and a non-linear equalizer function ($f$), which may be used at the equalization stage of the DPoD procedure. The base station 105 may transmit a set of parameters for the PA model, and a set of parameters for the non-linear equalizer function ($f$). The base station 105 may indicate, to the UE 115, a lookup table, a vector of lookup tales, a set of kernels (e.g., from which the UE 115 may estimate the coefficients of the PA model), or a set of both the kernels and the coefficients for the PA model. Similarly, for the equalizer function, the base station 105 may indicate an explicit indication of the function, or may indicate a lookup table, or a kernels series (e.g., with or without corresponding coefficients). Based on this information, the UE 115 may update a PA model and a non-linear equalizer function, quickly and efficiently estimate a distortion component of a received data signal, removes the distortion component, and decode the baseband signal without the distortion. This may allow for the base station 105 to transmit using the HPAs without violating any EVM limitations, and without applying a BO resulting in low transmit power and inefficient wireless communications. As a result, techniques described herein may result in improved reliability of wireless communications, decreased system delays and latency, and improved user experience.

Figure 2:
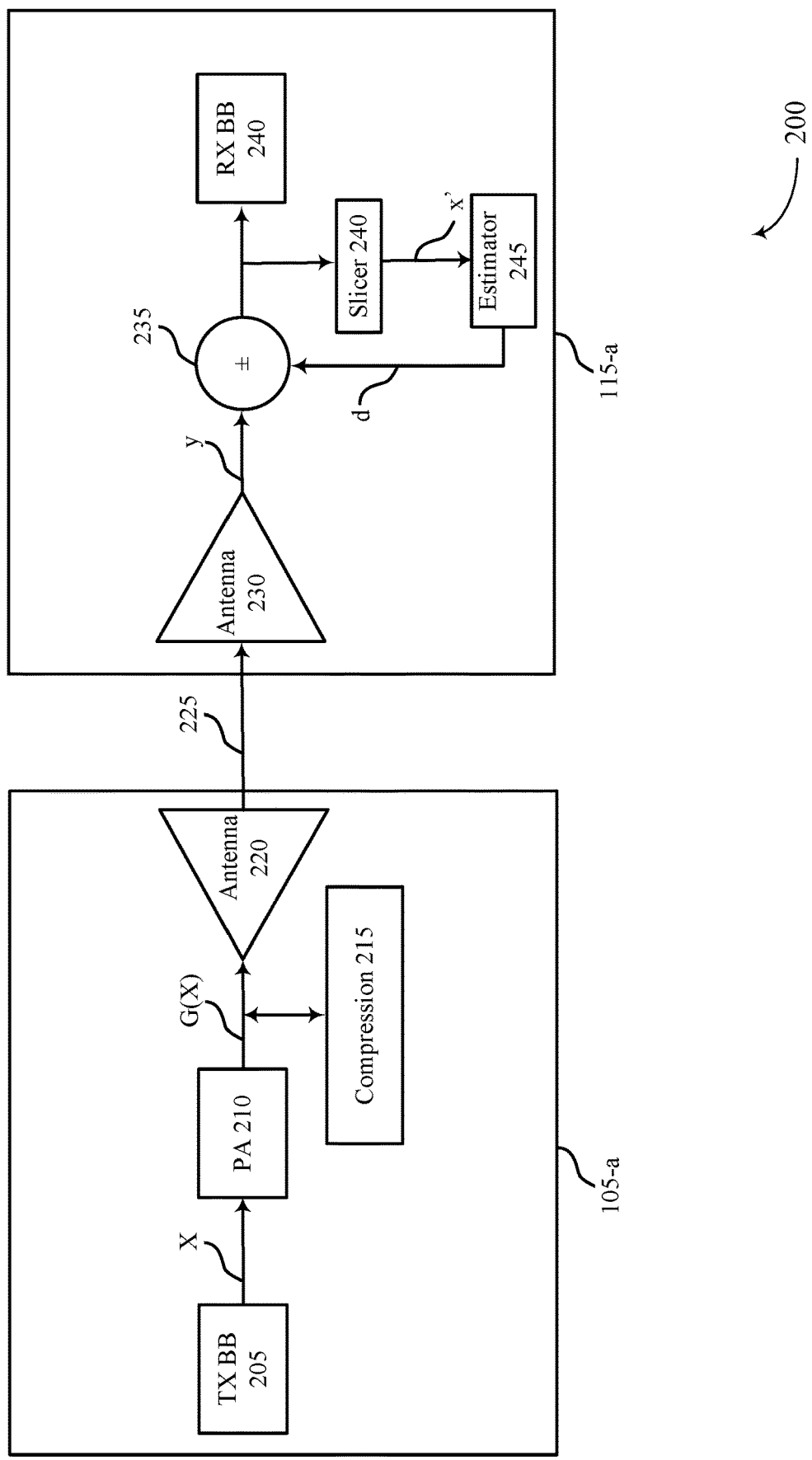
FIG. 2 illustrates an example of a wireless communications system that supports high order DPoD procedures in accordance with aspects of the present disclosure.

FIG. 2 illustrates an example of a wireless communications system 200 that supports high order DPoD procedures in accordance with aspects of the present disclosure. Wireless communications system 200 may support communications between a base station 105-a and a UE 115-a, which may be examples of corresponding devices described with reference to FIG. 1. The base station 105-a may transmit wireless communications to UE 115-a. Techniques described with reference to FIG. 2 may refer to the base station 105-a as a transmitting device, and the UE 115-a as a receiving device. However, techniques described herein may be implemented by any transmitting and receiving devices (e.g., a transmitting UE 115 and a receiving base station 105, two UEs 115 in communication with each other, two base stations 105 in communication with each other, or any other combination of difference wireless nodes, devices, or the like.

In some examples, a transmitting device (e.g., the base station 105-a) may transmit downlink wireless signals 225 to receiving wireless devices (e.g., UEs 115). The base station 105-a may utilize an HPA to transmit such downlink signaling. HPAs with limited linear dynamic range may generate nonlinear components, and may distort a transmitted signal. Non-linear models may include odd-order kernels (e.g., $x|x|^2$, $x|x|^4$, or the like). To avoid such distortion, the base station 105-a may introduce a power back-off (BO). Such procedures may function in regions where a PA is sufficiently linear (e.g., an Amplified power output at a transmitting device is linearly related to an amplified power input at a receiving device). However, for a high power BO, power efficiency may be poor. That is, less power may be transmitted to a particular wireless channel as a result of the power BO. This may in turn result in poor reception at the UE 115-a.

As an alternative applying a power BO, the wireless communications system 200 may support DPoD procedures, which may be utilized to maintain an amount of distortion at or below a target level (e.g., a threshold distortion level). DPoD procedures may be post-PA equalizers. Such procedures may clean a receiver-side signal by removing non-linearities from a received signal. By utilizing DPoD procedures, wireless communications from the base station 105-a to the UE 115-a may support reduced power BO and higher power efficiency, without compromising EVM standard conformity. For example, if a power BO is not applied, and channel distortions are introduced by HPAs at the base station 105-a, then the UE 115-a may receive wireless signals that exceed an EVM threshold. However, by implementing DPoD procedures at the UE 115-a, the UF, 115-a may receive signaling form the base station 105-a at a high power efficiency without exceeding EVM requirements. Thus, non-linear equalizers may be used by the UE 115-a to reduce the HPA non-linearity effects, and may be used iteratively to improve the HPA output estimation in order to improve non-linear equalizer accuracy, as described herein.

The base station 105-a may generate and transmit an amplified signal. The base station may generate a baseband signal X at the transmitter baseband 205. The base station 105-a may perform power amplification to generate amplified signal G (x) at the PA 210. The base station 105-a may perform a compression 215. The compression 215 may include a high compression with one or more odd-order kernels (e.g., $x|x|^2$, $x|x|^4$, etc.), and one or more coefficients (e.g., $a_1$, $a_3$, $a_5$, etc.). Thus, the base station 105-a may generate a power amplified signal G(x), where $G(x)=a_1x+a_3x|x|^2+a_5x|x|^4+\ldots$. The base station 105-a may generate the power amplified signal G(x) according to a PA model (e.g., $G(x)=a_1x+a_3x|x|^2+a_3x|x|^2+a_5x|x|^4+\ldots$). The base station 105-a may transmit a wireless signal 225 by transmitting the power amplified signal G (x) via one or more antennas 220.

The UE 115-a may receive the wireless signal 225 via one or more antennas 230, and may perform a DPoD to cleanse the wireless signal 225 of any non-linearity components. Such procedures may be based on a decomposition procedure (e.g., a Bussgang decomposition), where the output of a non-linear function y(x) is decomposed into a linear term and an additive uncorrelated distortion component (e.g., y(x)=ax+d, where ax represents the linear term of the non-linear function and d represents the uncorrelated distortion component).

In each iteration of a DPoD procedure, the UE 115-*a* may use slicing to estimate transmitted symbols (e.g., x'), feeding sliced symbols through a PA non-linear model in order to estimate the non-linear distortion component d, which is then subtracted from the non-linearly distorted signal Y to restore the non-distorted data signal (e.g., X as generated by the transmitter baseband 205). For instance, the UE 115-*a* may receive the wireless signal 225 (e.g., as transmitted by the base station 105-*a*), as a distorted signal Y. The UE may slice the received signal Y via slicer 240. For instance, the UE 115-*a* may attempt to apply the received signal Y to a constellation point to estimate transmitted symbols x' (e.g., the UE 115-*a* may estimate symbols of the original signal X. The UE 115-*a* may feed sliced symbols x' through the PA non-linear model to estimate the non-linear distortion component d. Modifier 235 may remove (e.g., subtract) the estimated value of d from the received signal y. Then the UE 115-*a* may repeat the process iteratively until the received signal y is as close as possible (e.g., within a threshold) of the original signal x. In some examples, slicing operations may accelerate convergence. However, such slicing procedures may not be mandatory. In some examples (e.g., OFDM scenarios), such procedures may rely on fast Fourier transforms (FFTs) by the base station 105-*a* and inverse FFTs (IFFTs) by the receiving UE 115-*a* for each OFDM symbol.

In some examples, as described in greater detail with reference to FIG. 3, the UE 115-*a* may utilize a lower order (e.g., or linear model, such as y(x)=ax+d) function to estimate and mitigate nonlinearities. However, such lower order equalizer functions at the UE 115-*a* may result in initial estimates of d that are not particularly accurate. Because of the inaccuracy of an initial estimate of d, the UE 115-*a* may perform multiple iterations of the DPoD procedure, resulting in decreased efficiency, increased battery expenditure, increased delays at the UE 115-*a*, and increased system delays. However, by utilizing a higher order equalizer function at the UE 115-*a* (e.g., using a larger number of odd-order kernels), the UE 115-*a* may estimate a value for d that is much more accurate. Because of a more accurate estimate of d, the UE may identify and remove the distortion from the received signal in less iterations, resulting in decreased delays, improved and extended battery life, decreased latency, and improved user experience. However, to use higher order equalizer functions, the UE 115-*a* may rely on signaling from the base station 105-*a* regarding a PA model used by the base station (e.g., the compression 215), a non-linear equalizer function for the UE 115-*a* to use for the DPoD procedure (e.g., to estimate d), or both.

In some examples, as described in greater detail with reference to FIG. 4, the base station 105-*a* may indicate, to the UE 115-*a*, each time the base station 105-*a* changes a non-linearity model. The base station 105-*a* may change the PA non-linearity model due to one or more changing parameters. For instance, the base station 105-*a* may change the PA model due to temperature variations, beam change, or the like. Each time the PA model is changed (e.g., as indicated by the base station 105-*a*), the UE 115-*a* may update its PA model used for the non-linear distortion estimation stage, and the non-linear equalizer function (f) used at the equalization stage. For instance, the UE 115-*a* may utilize the updated PA model for estimation of the transmitted symbols x' via the slicer 240, and may update the non-linear equalizer function used by the estimator 245 to identify d.

In some examples, the UE may re-estimate by itself the new DPoD functionality based on the gNB indication, and receiving one or more dedicated pilot signals, as described in greater detail with reference to FIG. 5. In some examples, the UE 115-*a* may request additional information from the base station to aid DPoD computations. For example, the UE 115-*a* may determine that estimation of d is inefficient, or does not satisfy a threshold amount of time (e.g., takes too long), or that estimations of d over time result in an excessive amount of iterations (e.g., a number of iterations that satisfies a threshold number of iterations), or the like. In such examples, based on such determinations, the UE 115-*a* may request updated information regarding the PA model, the non-linear equalizer function, or both. Additionally, or alternatively, the UE 115-*a* may request the information regarding the PA model, the non-linear equalizer function, or both, in response to an indication that the base station 105-*a* has updated its PA model.

The base station 105-*a* may indicate, to the UE 115-*a*, one or more parameters for the PA model, one or more parameters for the non-linear equalizer function, or both. For example, the base station 105-*a* may transmit a representation of the PA model. For instance, the representation of the PA model may be described as a set of coefficients c and a set of kernels K (e.g., where $c_1$ and $c_1$ are coefficients for kernels $K_1$ and $K_2$). In some examples, the base station 105-*a* may transmit a representation of the PA model defined in terms of a lookup table (LUT), or a vector of LUTs for a memory PA model (e.g., if the UE 115-*a* is not memoryless). The LUT or the vector of LUTs, may define a set of values that describe the non-linear model (e.g., per signal amplitude, for example. In some examples, the LUT may include a set of different PA models. Each of the set of PA models may be described as kernels and coefficients, or otherwise. Each PA model of the set of PA models may correspond to an index. In some examples, the base station may indicate one of the set of PA models via an index corresponding to the LUT.

The base station 105-*a* may transmit, to the UE 115-*a*, an indication of the complete PA model. The indication of the complete PA model may include the function used by the base station 105-*a* to perform the power amplification, the compression 215, or the like. The PA model may be any mathematical function used by the base station to apply the power amplification, or may be any model for estimation or approximating the PA model, or the like. In some examples, the indication of the PA model may be in the form of a LUT (e.g., if the UE 115-*a* is memoryless or operating in a memoryless mode), or in the form of a vector of LUTs (e.g., if the UE 115-*a* is not memoryless or is not operating in a memoryless mode), or the like. IN some examples, the base station 105-*a* may indicate, to the UE 115-*a*, the kernels of a series (e.g., a Volterra polynomial) for the PA model. The base station 105-*a* may also indicate, to the UE 115-*a*, the coefficients of the PA model. In some examples, the base station 105-*a* may transmit, to the UE 115-*a*, only the kernels of the PA model, and may also transmit one or more pilot signals. The pilot signals may be designed for estimation of the coefficients of the PA model. The dedicated pilot signals may span frequency resources, time resources, spatial resources, or the like, or may be transmitted at a transmit power, that is sufficient for estimation of coefficients for the PA model utilized by the base station 105-*a*. The UE 115-*a* may utilize the indicated kernels of the PA model, and the received pilot signals, to estimate the coefficients for the PA model. In some examples, the UE 115-*a* may implicitly determine the non-linear equalizer function based on complete PA model information received from the base station 105-*a*. For example, the base station 105-*a* may transmit, to the UE 115-*a*, an indication of a complete PA model (e.g., via a LUT, a vector of LUTs, a set of kernels and coefficients for the PA model, or the like). The UE 115-*a* may implicitly determine a non-linear equalizer function based on the PA model (e.g., without receiving an indication of any parameters for the non-linear equalizer function).

In some examples, the base station 105-*a* may indicate, to the UE 115-*a*, one or more parameters for the non-linear equalizer function. The base station 105-*a* may indicate, to the UE 115-*a*, a LUT, or a kernels series, with or without the coefficients.

Figure 3:
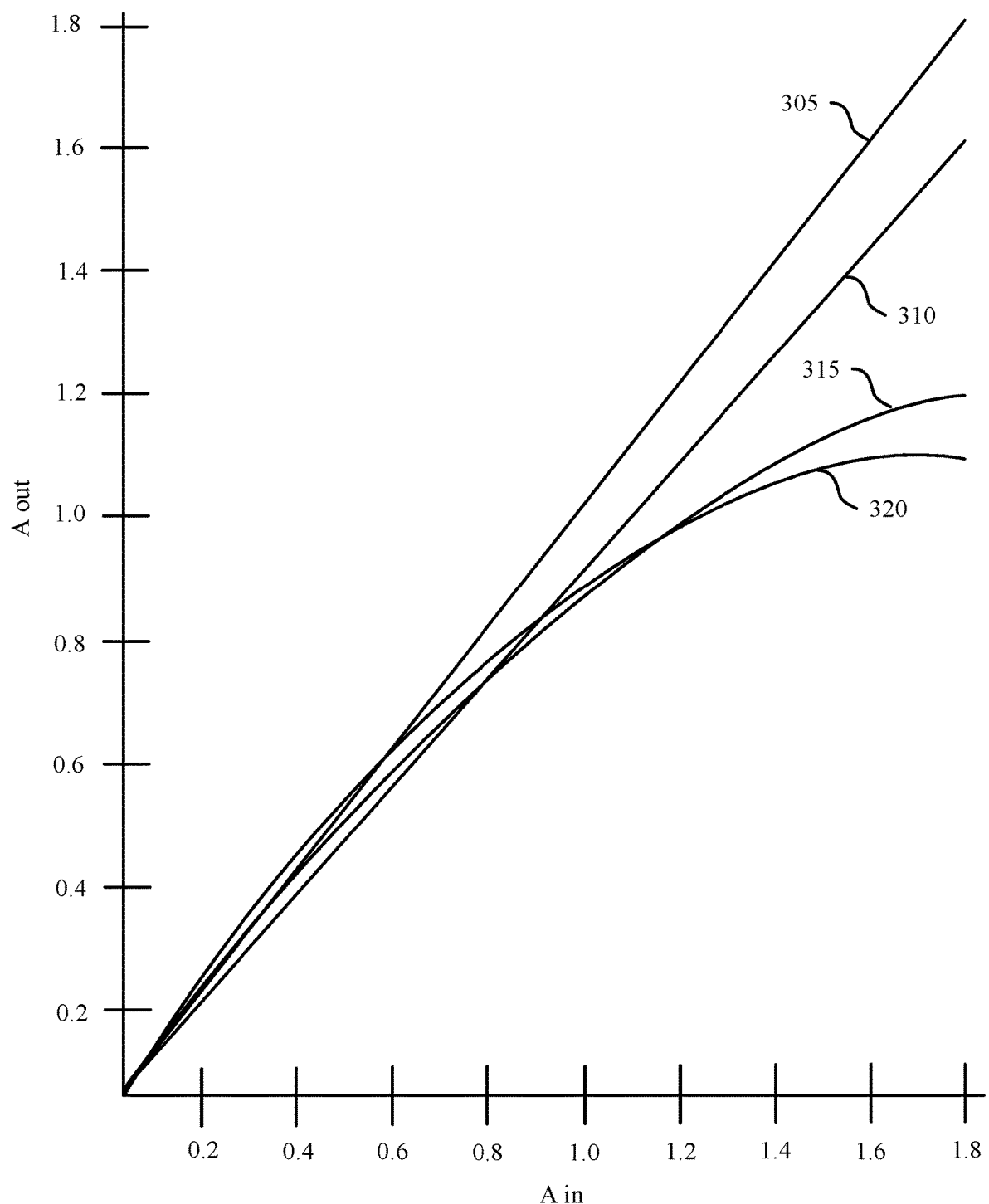
FIG. 3 illustrates an example of a power amplification scenario that supports high order DPoD procedures in accordance with aspects of the present disclosure.

FIG. 3 illustrates an example of a power amplification scenario 300 that supports high order DPoD procedures in accordance with aspects of the present disclosure. Power amplification scenario 300 may be implemented by one or more wireless devices, such as a transmitting device (e.g., a base station 105) and a receiving device (e.g., a UE 115), which may be examples of corresponding devices described with reference to FIGS. 1-2.

A transmitting device may transmit wireless signaling at a power amplification $A_{out}$, and a receiving device may receive the wireless signaling at a power amplification $A_{in}$. A non-linearity output (e.g., generated by a transmitting device using HPAs) may be approximated as $$PA(x) = \sum_{i=1, i=odd}^{\infty} a_i x|x|^{(i-1)}.$$

in practice, first odd powers may be dominant. Thus, a PA model used by the transmitting device may be reduced as $$f(i) = \sum_{i=1, i=odd}^{K} a_i x|x|^{(i-1)} + d,$$

where d represents a remaining non-linear distortion component. In some examples, for K=3: $f(x)=a_1 x+a_3|x|^2 x+d$. As described in greater detail with reference to FIG. 2, using higher order non-linear equalizer functions (e.g., such as the function described with reference to FIG. 3, where K=3, K=5, K=7, or the like) may result in a more accurate identification and mitigation of non-linear distortion of a transmitted signal.

For example, amplification relationship 305 may represent an ideal power amplification, where the relationship between $k_{out}$ and $A_{in}$ is linear (e.g. y=x). However, amplification relationship 305 may represent a true PA model, where $A_{in}$ and $A_{out}$ do not have a linear relationship as power amplification increases. That is, $A_{out}$ of 1.2 may result in $A_{in}$ of 1.8. Such distortion may be estimated as d, as described herein. However, using a lower order model (e.g., a first order Bussgang equalizer function) may result in amplification relationship 310. Amplification relationship p310 may be the closest linear estimation that can be generated by a lower order equalizer function (e.g., such as y(x)=ax+d). However, the estimated d resulting from such lower order equalizer functions may be relatively inaccurate (e.g., given the difference between estimated amplification relationship 310 and the true or accurate PA model represented by amplification relationship 320). However, use of higher order non-linear equalizer functions (e.g. such as a send order Bussgang equalizer function) may result in an estimated amplification relationship 315, which is much closer to the accurate PA model represented by amplification relationship 320. Because higher order functions may result in an amplification relationship that is closer to the true PA model (e.g., the amplification relationship 320), the estimated d may be smaller, which may result in an iterative process (e.g., a DPoD procedure, as described with reference to FIG. 2), that converges faster than a larger initially estimated d value. High-order Busgang iterations may be formulated, by explicitly including high-order non-linear terms in a reconstruction process.

In some examples, an equalization function may be selected to be an invertible function. For example, for a high-order Bussgang iterations for estimation a transmitted signal x and a distortion component d. For instance, based on $y(x)=f(x)+d$ (e.g., where $f(x)$ is a higher order non-linear equalizer function), a correction function (e.g., for correcting a signal received with a distortion element) may be defined as $y_{corrected}=y-\hat{d}$. The equalization procedure may be defined as $\tilde{x}=f^{-1}(y_{corrected})$ (e.g., the inverse of $y_{corrected}$) A slicing procedure (e.g., which may be optional) may be defined as $\hat{x}=Slice\{\tilde{x}\}$. An estimation of the distortion element d may be defined as $\hat{d}=PA\_model(\hat{x})-f(\hat{x})$. In such examples, an output of a DPoD may be defined as Output: $f^{-1}(y-\hat{d})$.

To take advantage of the benefits of higher order equalizer functions, as described herein, a transmitting device may provide an indication of an updated PA model, a non-linear equalizer function, or both, as described in greater detail with reference to FIG. 4.

Figure 4:
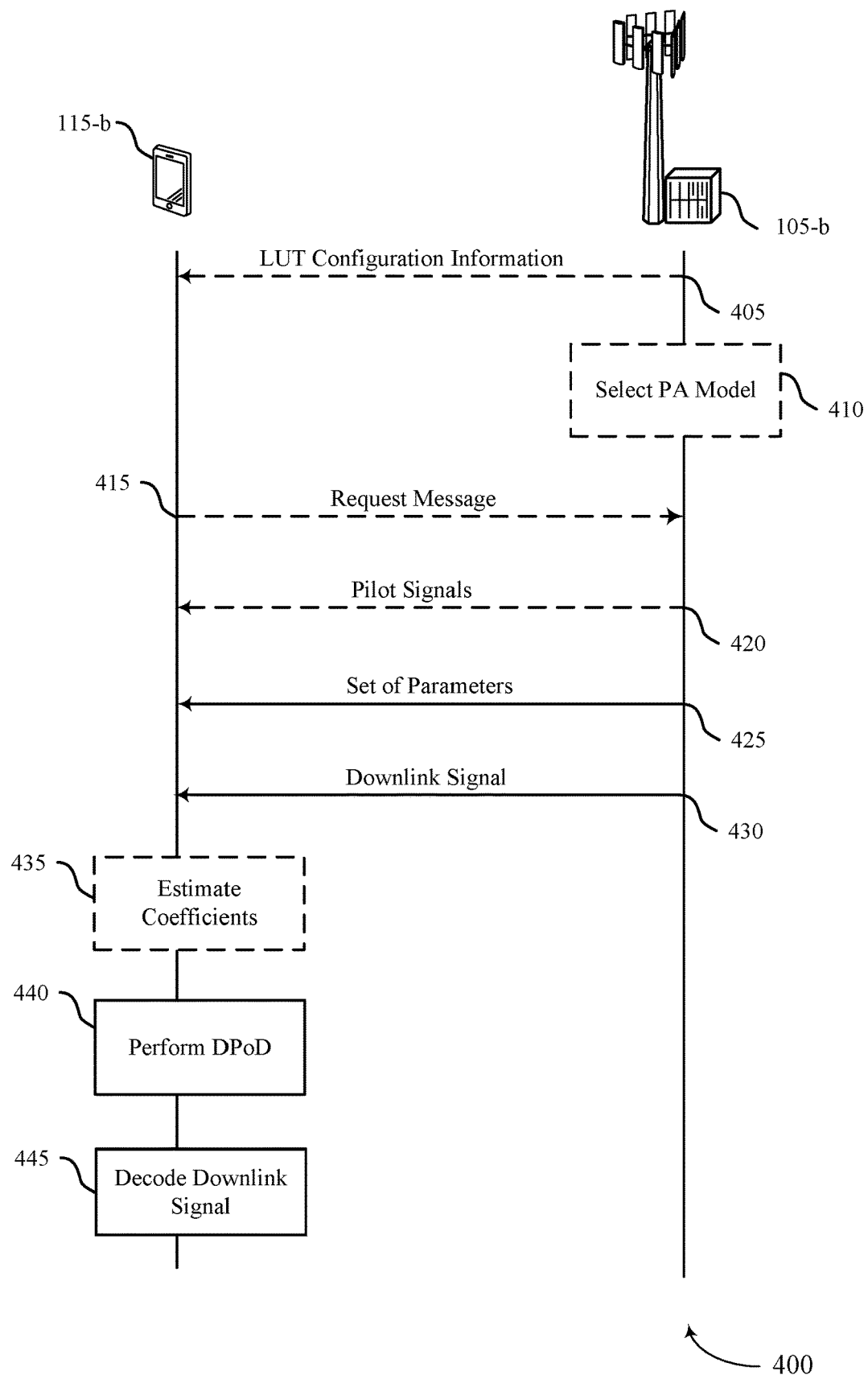
FIG. 4 illustrates an example of a process flow that supports high order DPoD procedures in accordance with aspects of the present disclosure.

FIG. 4 illustrates an example of a process flow 400 that supports high order DPoD procedures in accordance with aspects of the present disclosure. Process flow 400 may include a UE 115-*b* and a base station 105-*b*, which may be examples of corresponding devices described with reference to the FIGS. 1-3.

At 425, the base station 105-*b* may transmit, and the UE 115-*b* may receive, one or more sets of parameters. For instance, the UE 115-*a* may receive a first set of parameters corresponding to a PA model associated with downlink signaling, a second set of parameters corresponding to a non-linear equalize function, or both.

In some examples, the first set of parameters corresponding to the PA model may include an indication of the complete PA model (e.g., a function used for power amplification at the base station 105-*b*). In some examples, the first set of parameters may include a set of kernels for the power amplifier model. In such examples, the UE 115-*b* may receive one or more pilot signals (e.g., at 420), and may estimate coefficients for the PA model based on the set of kernels and the received pilot signals. For example, the UE 115-*b* may estimate one or more coefficients α for one or more kernels $[x, x|x|^2, \ldots, x|x|^{K-1}]$ for an order K according to equation 1:

$$y = [x, x|x|^2, \ldots, x|x|^{K-1}] \begin{bmatrix} \alpha_1 \\ \alpha_2 \\ \vdots \\ \alpha_K \end{bmatrix} = H\theta \rightarrow \hat{\theta}_{LS} = (H^H H)^{-1} H^H y \quad \text{Equation 1}$$

where H represents entropy for the estimated function.

In some examples, the first set of parameters may include an indication of a set of kernels for the power amplifier model and a set of coefficients for the power amplifier model. In some examples, the first set of parameters may be indicated via a LUT or a vector of LUTs. For instance, the base station 105-*b* may provide, to the UE 115-*b* (e.g., at 405), higher layer signaling (e.g., radio resource control (RRC) signaling, media access control (MAC) control element (CE) signaling, or the like) indicating LUT configuration information. The LUT configuration information may include a LUT, or a vector of LUTs, or the like. For instance, a LUT may include a set of indices, each index associated with a particular PA model, a particular equalizer function, or both. In such examples, at 425, the base station 105-*b* may indicate (e.g., via higher layer signaling such as RRC signaling, or dynamic signaling such as downlink control information (DCI) signaling) an index value. The UE 115-*b*, upon receiving the index, may identify (e.g., via the LUT or the vector of LUTs) a PA model, an equalizer function, or both).

In some examples, the second set of parameters may include an indication of a model for the non-linear equalizer function. In some examples, the second set of parameters may include a set of kernels for the non-equalizer function. In some examples, at 435, the UE 115-*b* may estimate coefficients for the non-equalizer function based at least in part on pilot signals (e.g., received from the base station 105-*b* for estimating the non-equalizer function at 420), and the set of kernels indicated at 425. In some examples, the second set of parameters may include both a set of kernels and a set of coefficients for the non-linear equalizer function. In some examples, as described herein, the set of parameters may be indicated by an index associated with a LUT or vector of LUTs indicated via LUT configuration information received at 405.

In some examples, the base station 105-*b* may indicate, to the UE 115-*b*, that it has changed its PA model. For instance, the base station 105-*b* may select a PA model at 410 (e.g., may change from a previously utilized PA model to a current PA model). In such examples, the base station 105-*b* may select the PA model based on a change in one or more conditions (e.g., a change in temperature, a change in beam, detected interference, changes in power settings, switches in frequency resources, time resources, spatial resources, or the like, or any combination thereof). The base station 105-*b* may transmit such an indication together with the set or sets of parameters at 425, or in a separate message (e.g., prior to transmitting the parameters to the UE 115-*b*).

In some examples, the base station 105-*b* may transmit the set or sets of parameters in response to a request message received from the UE 115-*b*. For example, at 415, the UE 115-*b* may transmit a request message, requesting additional information from the base station 105-*b* regarding the PA model, the non-linear equalizer function, or both. The UE 115-*b* may autonomously transmit such a request message, or may transmit such a message in response to an indication that the base station 105-*b* has selected an updated PA model at 410.

At 430, the base station 105-*a* may transmit, and the UE 115-*b* may receive, a downlink signal from the base station 105-*b*.

At 440, the UE 115-*b* may perform a DPoD procedure on the downlink signal received from the base station 105-*b* at 430. Based on performing the DPoD procedure, the UE 115-*b* may identify and remove a distortion element associated with the downlink signal, as described in greater detail with reference to FIGS. 2-3.

At 445, the UE 115-*b* may decode the downlink signal, based on having removed the distortion element from the downlink signal at 440.

Figure 5:
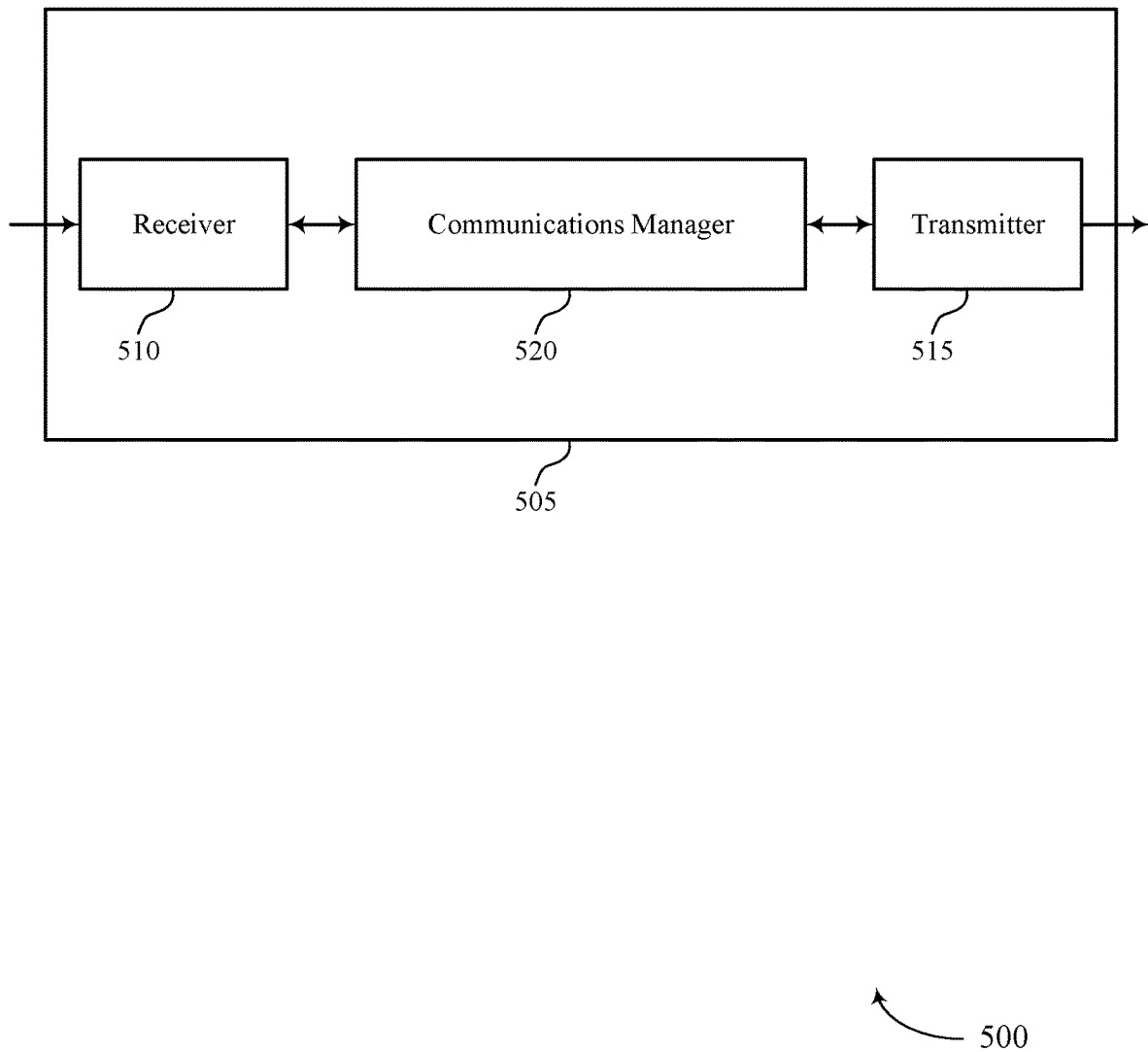
FIGS. 5 and 6 show block diagrams of devices that support high order DPoD procedures in accordance with aspects of the present disclosure.

FIG. 5 shows a block diagram 500 of a device 505 that supports high order DPoD procedures in accordance with aspects of the present disclosure. The device 505 may be an example of aspects of a UE 115 as described herein. The device 505 may include a receiver 510, a transmitter 515, and a communications manager 520. The device 505 may also include one or more processors, memory coupled with the one or more processors, and instructions stored in the memory that are executable by the one or more processors to enable the one or more processors to perform the high order DPoD. Each of these components may be in communication with one another (e.g., via one or more buses).

The receiver 510 may provide a means for receiving information such as packets, user data, control information, or any combination thereof associated with various information channels (e.g., control channels, data channels, information channels related to high order DPoD procedures). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to high order DPoD procedures). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of high order DPoD procedures as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a base station, a first set of parameters corresponding to a power amplifier model associated with downlink signaling and a second set of parameters corresponding to a non-linear equalizer function. The communications manager 520 may be configured as or otherwise support a means for performing a DPoD procedure on a downlink signal based on the power amplifier model and the non-linear equalizer function. The communications manager 520 may be configured as or otherwise support a means for removing a distortion element associated with the downlink signal based on the DPoD procedure. The communications manager 520 may be configured as or otherwise support a means for decoding the downlink signal subsequent to removing the distortion element associated with the downlink signal.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for high order DPoD procedures, resulting in more efficient decoding of received signaling, decreased latency, improved battery life at the UE, improved throughput, and improved user experience.

Figure 6:
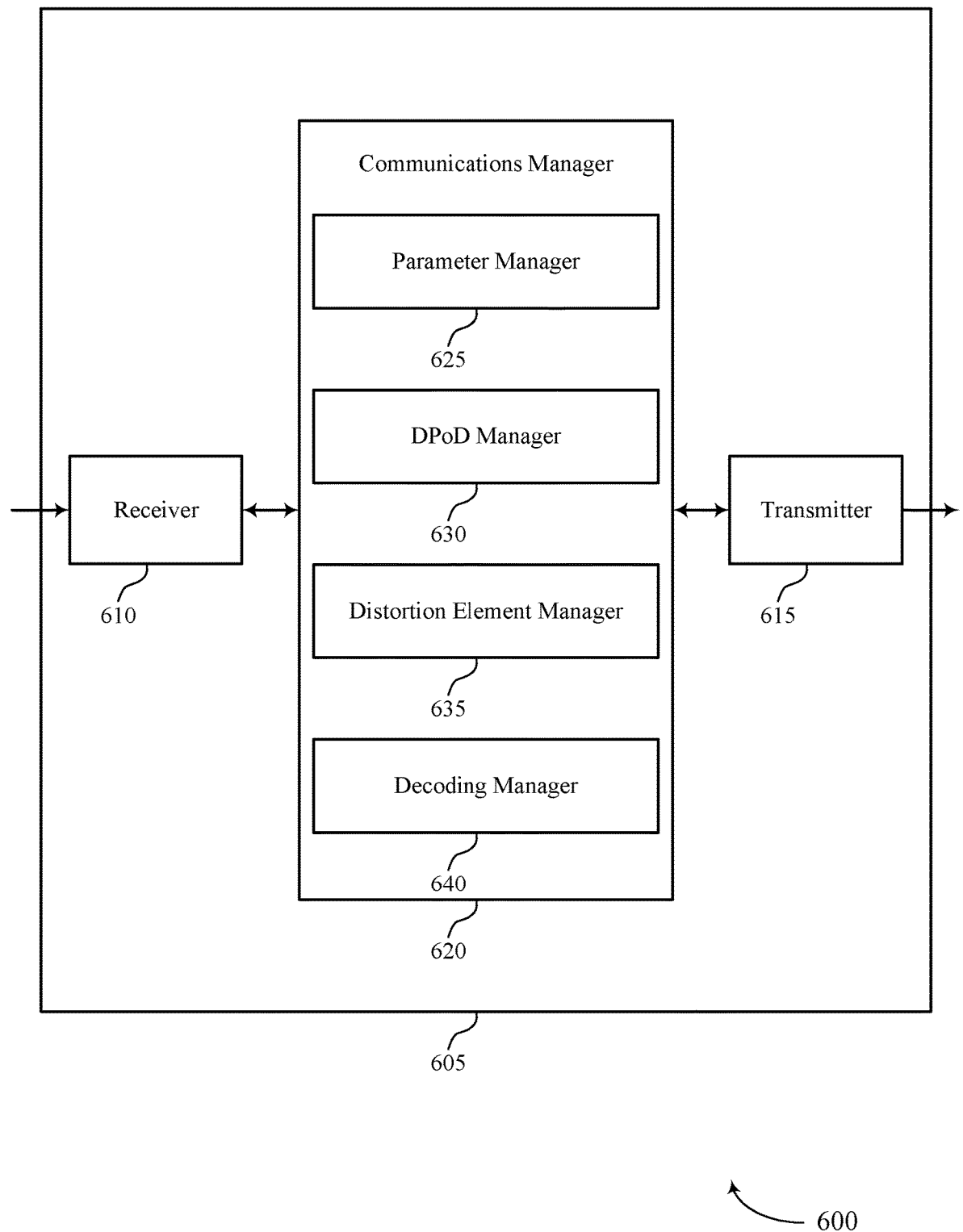

FIG. 6 shows a block diagram 600 of a device 605 that supports high order DPoD procedures in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to high order DPoD procedures). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to high order DPoD procedures). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of high order DPoD procedures as described herein. For example, the communications manager 620 may include a parameter manager 625, a DPoD manager 630, a distortion element manager 635, a decoding manager 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The parameter manager 625 may be configured as or otherwise support a means for receiving, from a base station, a first set of parameters corresponding to a power amplifier model associated with downlink signaling and a second set of parameters corresponding to a non-linear equalizer function. The DPoD manager 630 may be configured as or otherwise support a means for performing a DPoD procedure on a downlink signal based on the power amplifier model and the non-linear equalizer function. The distortion element manager 635 may be configured as or otherwise support a means for removing a distortion element associated with the downlink signal based on the DPoD procedure. The decoding manager 640 may be configured as or otherwise support a means for decoding the downlink signal subsequent to removing the distortion element associated with the downlink signal.

In some cases, the parameter manager 625, the DPoD manager 630, the distortion element manager 635, and the decoding manager 640, may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the parameter manager 625, the DPoD manager 630, the distortion element manager 635, and the decoding manager 640 discussed herein. A transceiver processor may be collocated with and/or communicate with (e.g., direct the operations of) a transceiver of the device. A radio processor may be collocated with and/or communicate with (e.g., direct the operations of 0 a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 7:
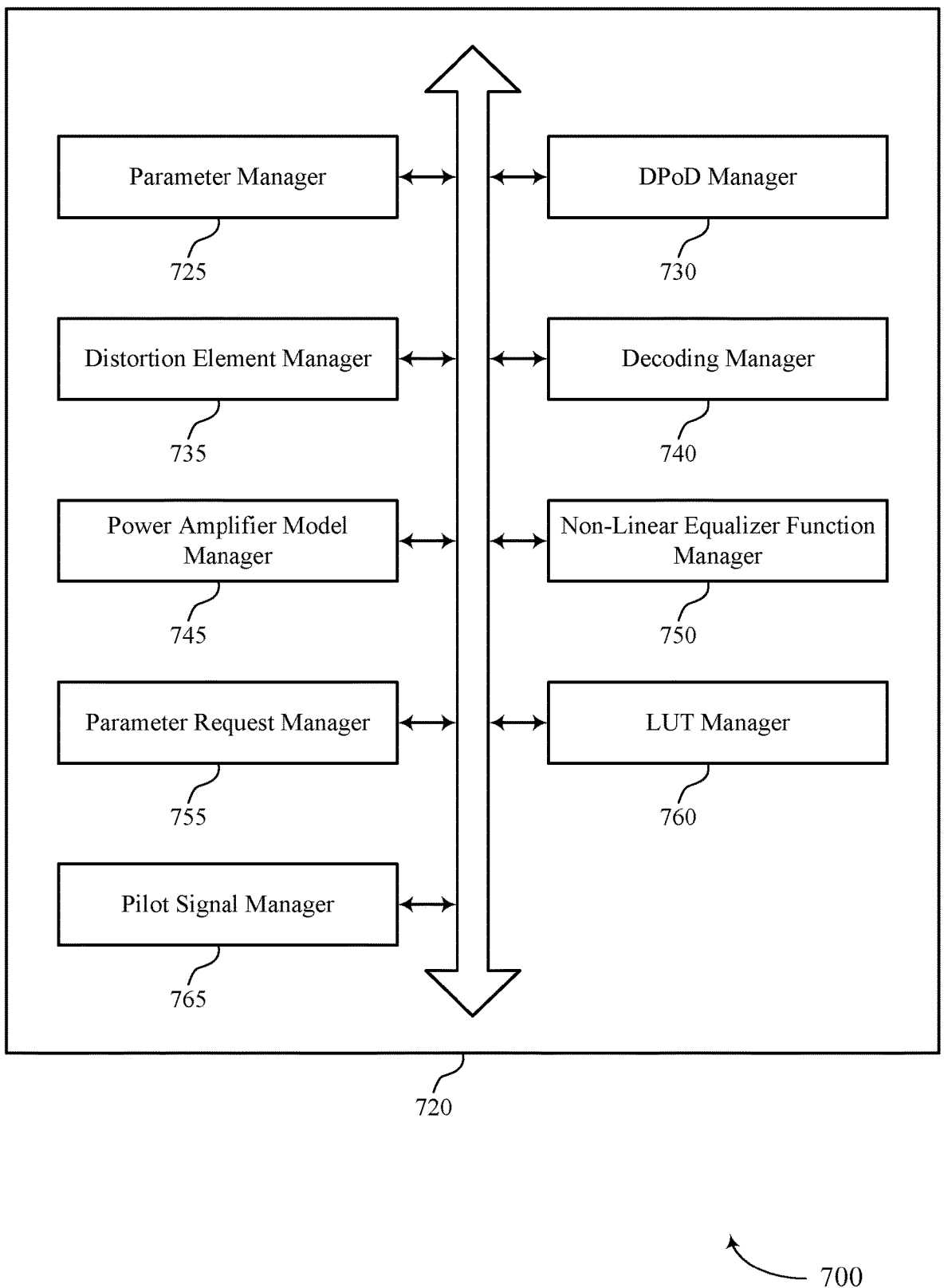
FIG. 7 shows a block diagram of a communications manager that supports high order DPoD procedures in accordance with aspects of the present disclosure.

FIG. 7 shows a block diagram 700 of a communications manager 720 that supports high order DPoD procedures in accordance with aspects of the present disclosure. The communications manager 720 may be an example of aspects of a communications manager 520, a communications manager 620, or both, as described herein. The communications manager 720, or various components thereof, may be an example of means for performing various aspects of high order DPoD procedures as described herein. For example, the communications manager 720 may include a parameter manager 725, a DPoD manager 730, a distortion element manager 735, a decoding manager 740, a power amplifier model manager 745, a non-linear equalizer function manager 750, a parameter request manager 755, a LUT manager 760, a pilot signal manager 765, or any combination thereof. Each of these components may communicate, directly or indirectly, with one another (e.g., via one or more buses).

The communications manager 720 may support wireless communications at a UE in accordance with examples as disclosed herein. The parameter manager 725 may be configured as or otherwise support a means for receiving, from a base station, a first set of parameters corresponding to a power amplifier model associated with downlink signaling and a second set of parameters corresponding to a non-linear equalizer function. The DPoD manager 730 may be configured as or otherwise support a means for performing a DPoD procedure on a downlink signal based on the power amplifier model and the non-linear equalizer function. The distortion element manager 735 may be configured as or otherwise support a means for removing a distortion element associated with the downlink signal based on the DPoD procedure. The decoding manager 740 may be configured as or otherwise support a means for decoding the downlink signal subsequent to removing the distortion element associated with the downlink signal.

In some examples, to support receiving the first set of parameters corresponding to the power amplifier model, the power amplifier model manager 745 may be configured as or otherwise support a means for receiving an indication of the power amplifier model used by the base station to transmit the downlink signal.

In some examples, to support receiving the first set of parameters corresponding to the power amplifier model, the power amplifier model manager 745 may be configured as or otherwise support a means for receiving an indication of a set of kernels for the power amplifier model.

In some examples, the pilot signal manager 765 may be configured as or otherwise support a means for receiving, from the base station, a set of pilot signals allocated for estimating power amplifier models, non-linear equalizer functions, or both. In some examples, the pilot signal manager 765 may be configured as or otherwise support a means for estimating a set of coefficients for the power amplifier model based on receiving the set of pilot signals and the set of kernels.

In some examples, to support receiving the first set of parameters corresponding to the power amplifier model, the power amplifier model manager 745 may be configured as or otherwise support a means for receiving an indication of a set of kernels for the power amplifier model and a set of coefficients for the power amplifier model.

In some examples, to support receiving the first set of parameters corresponding to the power amplifier model, the power amplifier model manager 745 may be configured as or otherwise support a means for receiving an indication of a vector of lookup tables including an indication of the power amplifier model.

In some examples, to support receiving the second set of parameters corresponding to the non-linear equalizer function, the non-linear equalizer function manager 750 may be configured as or otherwise support a means for receiving an indication of a model for the non-linear equalizer function.

In some examples, to support receiving the second set of parameters corresponding to the non-linear equalizer function, the non-linear equalizer function manager 750 may be configured as or otherwise support a means for receiving an indication of a set of kernels for the non-linear equalizer function.

In some examples, the pilot signal manager 765 may be configured as or otherwise support a means for receiving, from the base station, a set of pilot signals allocated for estimating power amplifier models, non-linear equalizer functions, or both. In some examples, the pilot signal manager 765 may be configured as or otherwise support a means for estimating a set of coefficients for the non-linear equalizer function based on receiving the set of pilot signals and the set of kernels.

In some examples, to support receiving the second set of parameters corresponding to the non-linear equalizer function, the non-linear equalizer function manager 750 may be configured as or otherwise support a means for receiving an indication of a set of kernels for the non-linear equalizer function and a set of coefficients for the non-linear equalizer function.

In some examples, the parameter request manager 755 may be configured as or otherwise support a means for transmitting, to the base station, a request for the first set of parameters, the second set of parameters, or both, where receiving the first set of parameters and the second set of parameters is based on transmitting the request.

In some examples, the LUT manager 760 may be configured as or otherwise support a means for receiving, from the base station, higher layer signaling including a lookup table associating a set of indices with respective parameters corresponding to the power amplifier model, respective parameters corresponding to the non-linear equalizer function, or both.

In some examples, to support receiving the first set of parameters corresponding to the power amplifier model associated with downlink signaling and the second set of parameters corresponding to the non-linear equalizer function, the LUT manager 760 may be configured as or otherwise support a means for receiving an index of the set of indices identifying the first set of parameters corresponding to the power amplifier model associated with downlink signaling, the second set of parameters corresponding to a non-linear equalizer function, or both, via the lookup table.

In some cases, the parameter manager 725, the DPoD manager 730, the distortion element manager 735, the decoding manager 740, the power amplifier model manager 745, the non-linear equalizer function manager 750, the parameter request manager 755, the LUT manager 760, and the pilot signal manager 765 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the parameter manager 725, the DPoD manager 730, the distortion element manager 735, the decoding manager 740, the power amplifier model manager 745, the non-linear equalizer function manager 750, the parameter request manager 755, the LUT manager 760, and the pilot signal manager 765 discussed herein.

Figure 8:
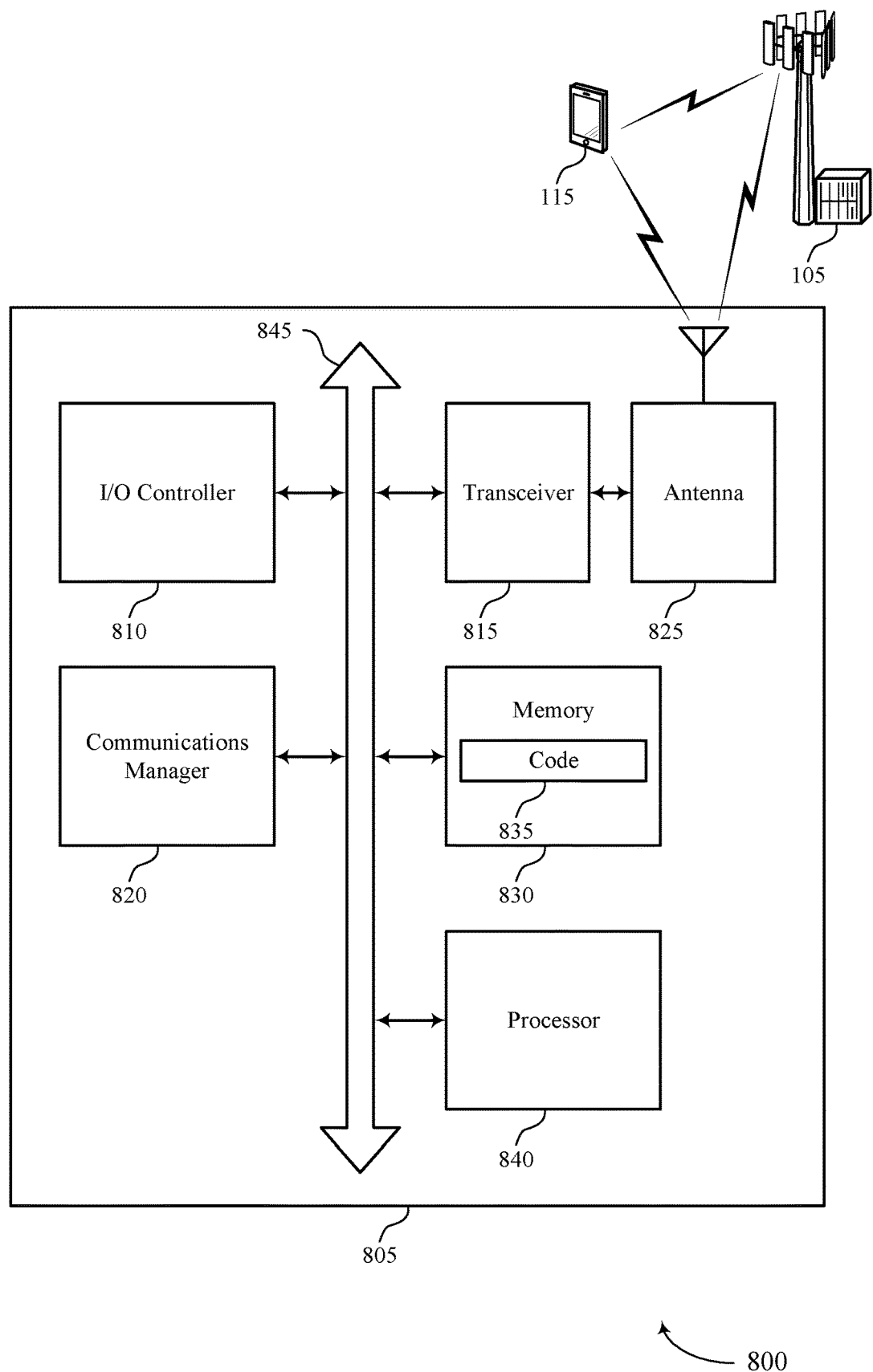
FIG. 8 shows a diagram of a system including a device that supports high order DPoD procedures in accordance with aspects of the present disclosure.

FIG. 8 shows a diagram of a system 800 including a device 805 that supports high order DPoD procedures in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting high order DPoD procedures). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a base station, a first set of parameters corresponding to a power amplifier model associated with downlink signaling and a second set of parameters corresponding to a non-linear equalizer function. The communications manager 820 may be configured as or otherwise support a means for performing a DPoD procedure on a downlink signal based on the power amplifier model and the non-linear equalizer function. The communications manager 820 may be configured as or otherwise support a means for removing a distortion element associated with the downlink signal based on the DPoD procedure. The communications manager 820 may be configured as or otherwise support a means for decoding the downlink signal subsequent to removing the distortion element associated with the downlink signal.

By including or configuring the communications manager 820 in accordance with examples as described herein, the device 805 may support techniques for high order DPoD procedures, resulting in more efficient decoding of received signaling, decreased latency, improved battery life at the UE, improved throughput, and improved user experience.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of high order DPoD procedures as described herein, or the processor 840 and the memory 830 may be otherwise configured to perform or support such operations.

Figure 9:
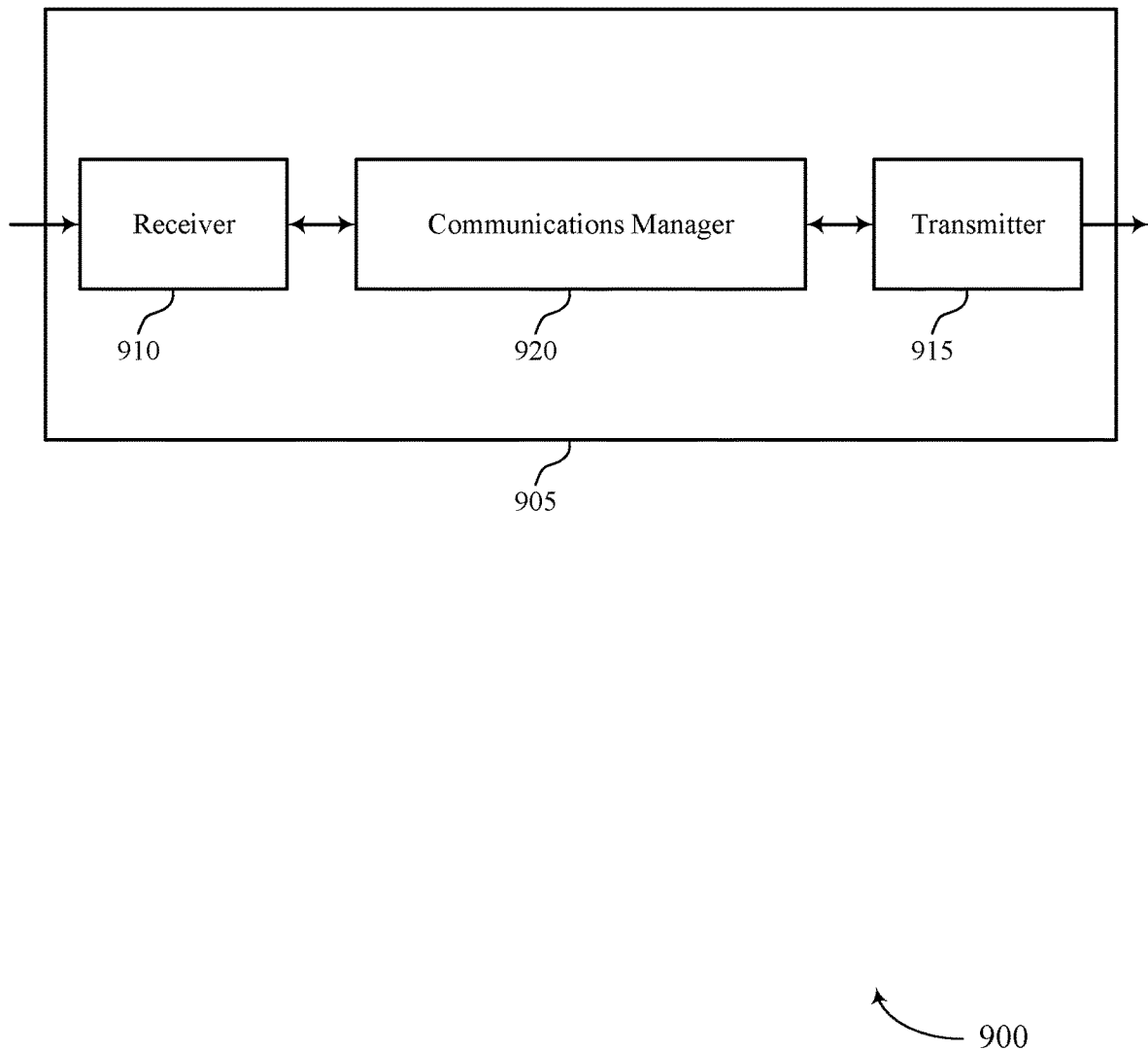
FIGS. 9 and 10 show block diagrams of devices that support high order DPoD procedures in accordance with aspects of the present disclosure.

FIG. 9 shows a block diagram 900 of a device 905 that supports high order DPoD procedures in accordance with aspects of the present disclosure. The device 905 may be an example of aspects of a base station 105 as described herein. The device 905 may include a receiver 910, a transmitter 915, and a communications manager 920. The device 905 may also include one or more processors, memory coupled with the one or more processors, and instructions stored in the memory that are executable by the one or more processors to enable the one or more processors to perform the high order DPoD procedure functions discussed herein. Each of these components may be in communication with one another (e.g., via one or more buses).

The receiver 910 may provide a means for receiving information such as packets, user data, control information, or any combination thereof associated with various information channels (e.g., control channels, data channels, information channels related to high order DPoD procedures). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to high order DPoD procedures). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of high order DPoD procedures as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for selecting a power amplifier model associated with downlink signaling according to a first set of parameters associated with the power amplifier model. The communications manager 920 may be configured as or otherwise support a means for transmitting, to a UE, the first set of parameters and a second set of parameters corresponding to a non-linear equalizer function corresponding to the power amplifier model. The communications manager 920 may be configured as or otherwise support a means for transmitting, to the UE, a downlink signal according to the power amplifier model.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for high order DPoD procedures, resulting in more efficient decoding of received signaling, decreased latency, improved battery life at the UE, improved throughput, and improved user experience.

Figure 10:
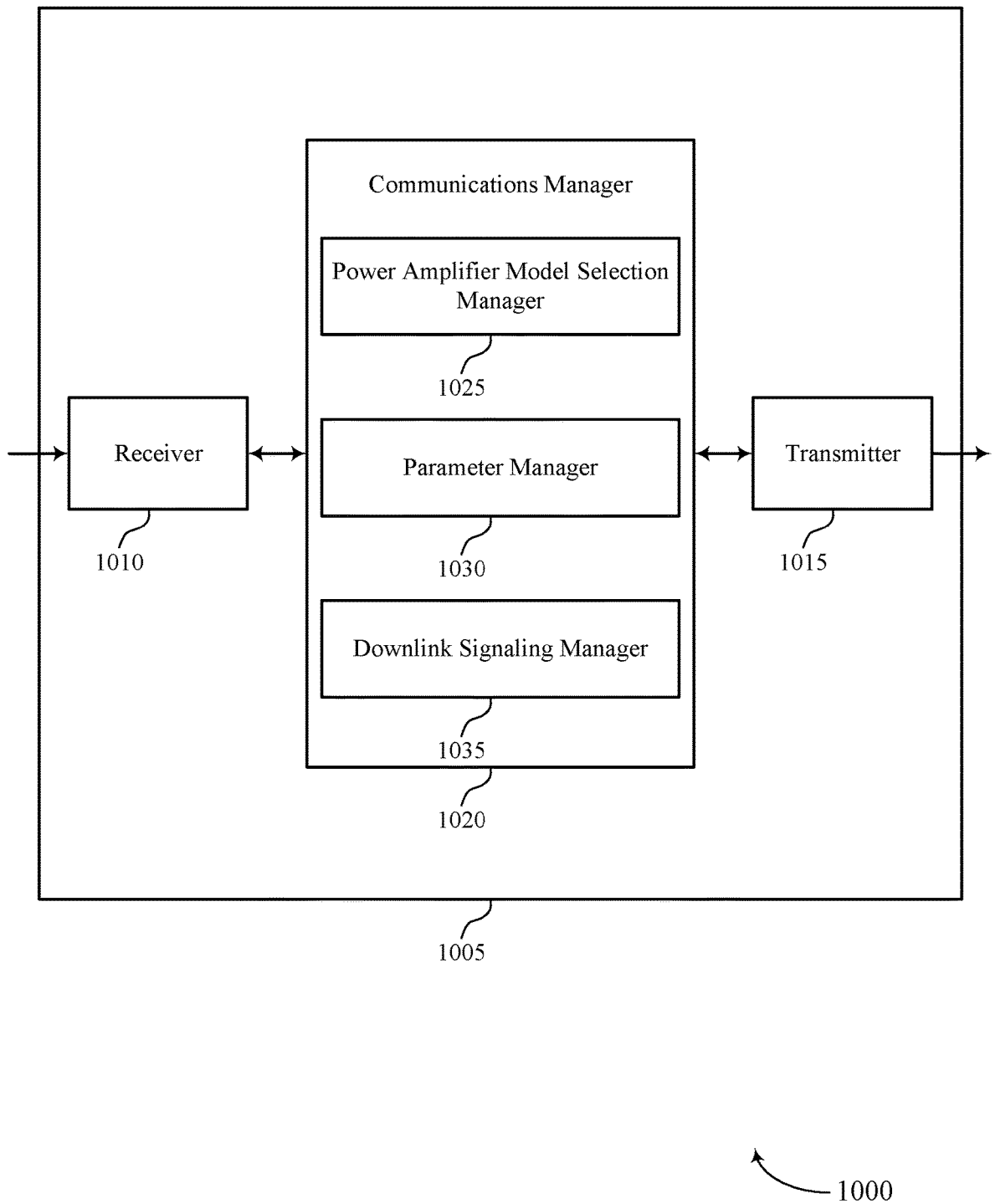

FIG. 10 shows a block diagram 1000 of a device 1005 that supports high order DPoD procedures in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to high order DPoD procedures). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to high order DPoD procedures). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of high order DPoD procedures as described herein. For example, the communications manager 1020 may include a power amplifier model selection manager 1025, a parameter manager 1030, a downlink signaling manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The power amplifier model selection manager 1025 may be configured as or otherwise support a means for selecting a power amplifier model associated with downlink signaling according to a first set of parameters associated with the power amplifier model. The parameter manager 1030 may be configured as or otherwise support a means for transmitting, to a UE, the first set of parameters and a second set of parameters corresponding to a non-linear equalizer function corresponding to the power amplifier model. The downlink signaling manager 1035 may be configured as or otherwise support a means for transmitting, to the UE, a downlink signal according to the power amplifier model.

In some cases, the power amplifier model selection manager 1025, the parameter manager 1030, and the downlink signaling manager 1035 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the power amplifier model selection manager 1025, the parameter manager 1030, and the downlink signaling manager 1035 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 11:
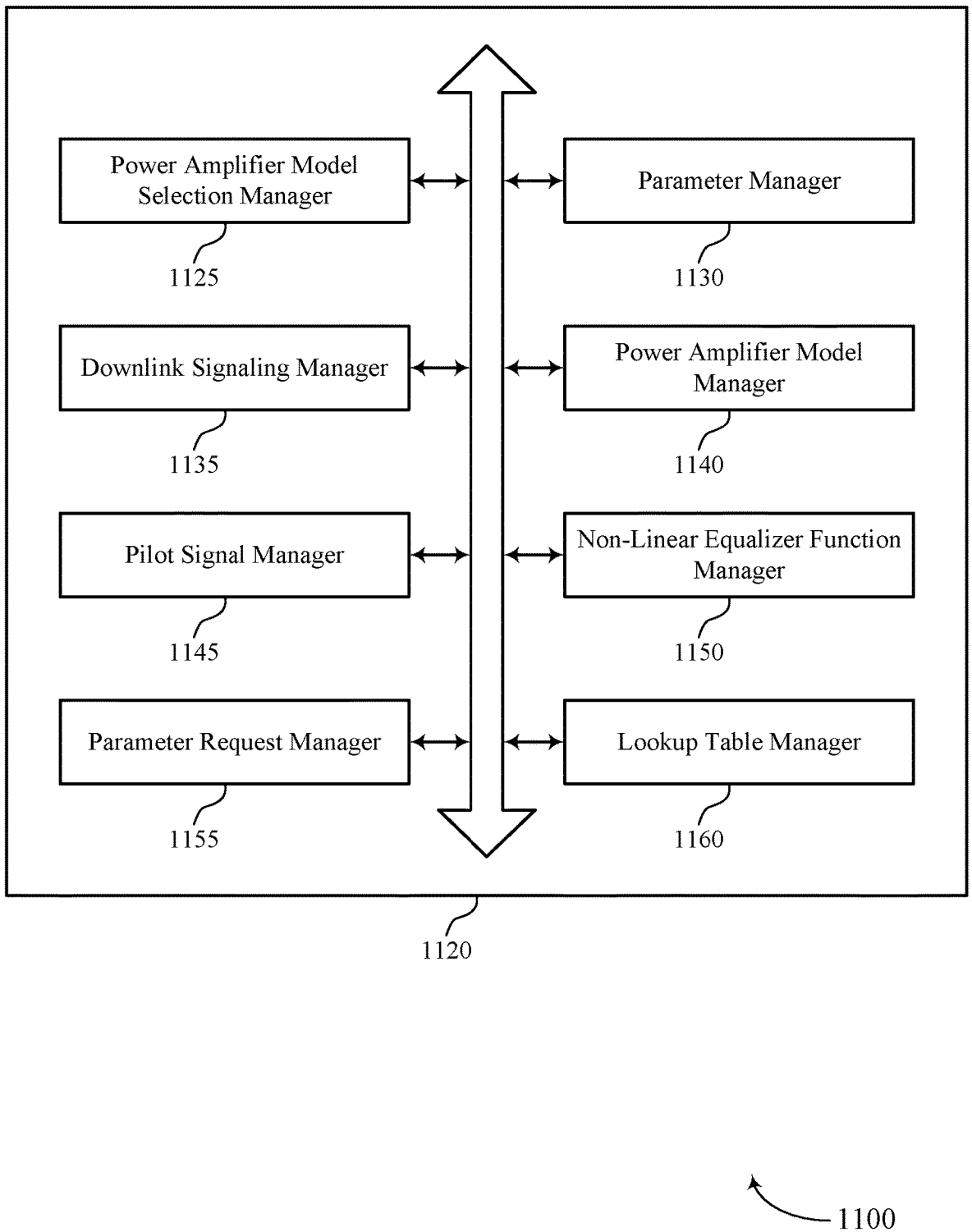
FIG. 11 shows a block diagram of a communications manager that supports high order DPoD procedures in accordance with aspects of the present disclosure.

FIG. 11 shows a block diagram 1100 of a communications manager 1120 that supports high order DPoD procedures in accordance with aspects of the present disclosure. The communications manager 1120 may be an example of aspects of a communications manager 920, a communications manager 1020, or both, as described herein. The communications manager 1120, or various components thereof, may be an example of means for performing various aspects of high order DPoD procedures as described herein. For example, the communications manager 1120 may include a power amplifier model selection manager 1125, a parameter manager 1130, a downlink signaling manager 1135, a power amplifier model manager 1140, a pilot signal manager 1145, a non-linear equalizer function manager 1150, a parameter request manager 1155, a lookup table manager 1160, or any combination thereof. Each of these components may communicate, directly or indirectly, with one another (e.g., via one or more buses).

The communications manager 1120 may support wireless communications at a base station in accordance with examples as disclosed herein. The power amplifier model selection manager 1125 may be configured as or otherwise support a means for selecting a power amplifier model associated with downlink signaling according to a first set of parameters associated with the power amplifier model. The parameter manager 1130 may be configured as or otherwise support a means for transmitting, to a UE, the first set of parameters and a second set of parameters corresponding to a non-linear equalizer function corresponding to the power amplifier model. The downlink signaling manager 1135 may be configured as or otherwise support a means for transmitting, to the UE, a downlink signal according to the power amplifier model.

In some examples, to support transmitting the first set of parameters corresponding to the power amplifier model, the power amplifier model manager 1140 may be configured as or otherwise support a means for transmitting an indication of the power amplifier model used by the base station to transmit the downlink signal.

In some examples, to support transmitting the first set of parameters corresponding to the power amplifier model, the power amplifier model manager 1140 may be configured as or otherwise support a means for transmitting an indication of a set of kernels for the power amplifier model.

In some examples, to support transmitting the first set of parameters corresponding to the power amplifier model, the power amplifier model manager 1140 may be configured as or otherwise support a means for transmitting an indication of a set of kernels for the power amplifier model and a set of coefficients for the power amplifier model.

In some examples, to support transmitting the first set of parameters corresponding to the power amplifier model, the power amplifier model manager 1140 may be configured as or otherwise support a means for transmitting an indication of a vector of lookup tables including an indication of the power amplifier model.

In some examples, the pilot signal manager 1145 may be configured as or otherwise support a means for transmitting, to the UE, a set of pilot signals allocated for estimating power amplifier models, non-linear equalizer functions, or both.

In some examples, to support transmitting the second set of parameters corresponding to the non-linear equalizer function, the non-linear equalizer function manager 1150 may be configured as or otherwise support a means for transmitting an indication of a model for the non-linear equalizer function.

In some examples, to support transmitting the second set of parameters corresponding to the non-linear equalizer function, the non-linear equalizer function manager 1150 may be configured as or otherwise support a means for transmitting an indication of a set of kernels for the non-linear equalizer function.

In some examples, to support transmitting the second set of parameters corresponding to the non-linear equalizer function, the non-linear equalizer function manager 1150 may be configured as or otherwise support a means for transmitting an indication of a set of kernels for the non-linear equalizer function and a set of coefficients for the non-linear equalizer function.

In some examples, the parameter request manager 1155 may be configured as or otherwise support a means for receiving, from the UE, a request for the first set of parameters corresponding to the power amplifier model associated with downlink signaling, the second set of parameters corresponding to a non-linear equalizer function, or both, where transmitting the first set of parameters and the second set of parameters is based on receiving the request.

In some examples, the lookup table manager 1160 may be configured as or otherwise support a means for transmitting, to the UE, higher layer signaling including a lookup table associating a set of indices with respective parameters corresponding to the power amplifier model, parameters corresponding to a non-linear equalizer function, or both.

In some examples, to support transmitting the first set of parameters corresponding to the power amplifier model associated with downlink signaling and the second set of parameters corresponding to the non-linear equalizer function, the lookup table manager 1160 may be configured as or otherwise support a means for transmitting an index of the set of indices identifying the first set of parameters corresponding to the power amplifier model associated with downlink signaling, the second set of parameters corresponding to a non-linear equalizer function, or both, via the lookup table.

In some examples, to support selecting the power amplifier model, the power amplifier model selection manager 1125 may be configured as or otherwise support a means for detecting a change in temperature, a beam change, or both. In some examples, to support selecting the power amplifier model, the power amplifier model selection manager 1125 may be configured as or otherwise support a means for switching from a previous power amplifier model to the power amplifier model based on the detecting.

In some cases, the power amplifier model selection manager 1125, the parameter manager 1130, the downlink signaling manager 1135, the power amplifier model manager 1140, the pilot signal manager 1145, the non-linear equalizer function manager 1150, the parameter request manager 1155, and the lookup table manager 1160 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the power amplifier model selection manager 1125, the parameter manager 1130, the downlink signaling manager 1135, the power amplifier model manager 1140, the pilot signal manager 1145, the non-linear equalizer function manager 1150, the parameter request manager 1155, and the lookup table manager 1160 discussed herein.

Figure 12:
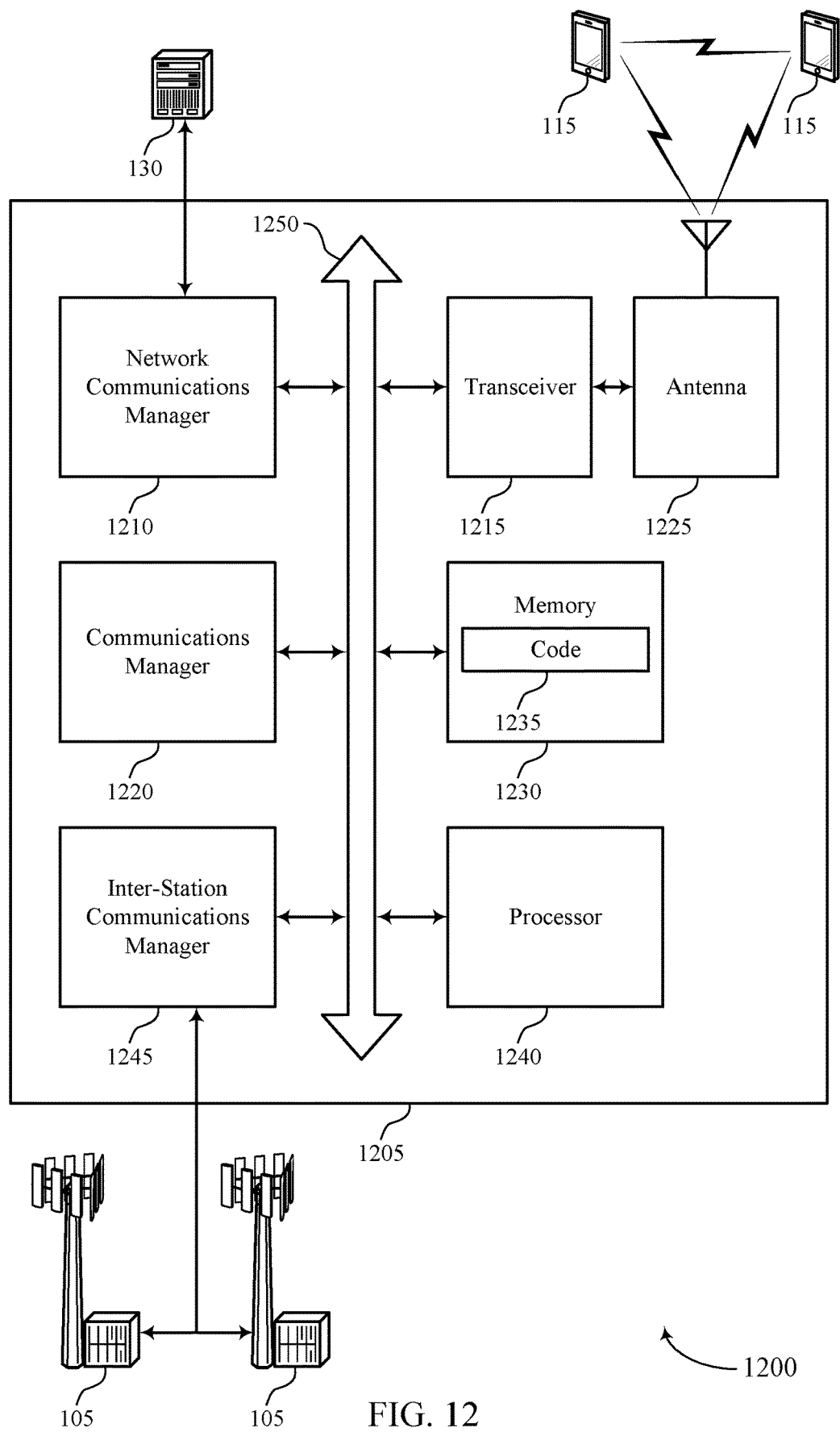
FIG. 12 shows a diagram of a system including a device that supports high order DPoD procedures in accordance with aspects of the present disclosure.

FIG. 12 shows a diagram of a system 1200 including a device 1205 that supports high order DPoD procedures in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting high order DPoD procedures). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for selecting a power amplifier model associated with downlink signaling according to a first set of parameters associated with the power amplifier model. The communications manager 1220 may be configured as or otherwise support a means for transmitting, to a UE, the first set of parameters and a second set of parameters corresponding to a non-linear equalizer function corresponding to the power amplifier model. The communications manager 1220 may be configured as or otherwise support a means for transmitting, to the UE, a downlink signal according to the power amplifier model.

By including or configuring the communications manager 1220 in accordance with examples as described herein, the device 1205 may support techniques for high order DPoD procedures, resulting in more efficient decoding of received signaling, decreased latency, improved battery life at the UE, improved throughput, and improved user experience.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of high order DPoD procedures as described herein, or the processor 1240 and the memory 1230 may be otherwise configured to perform or support such operations.

Figure 13:
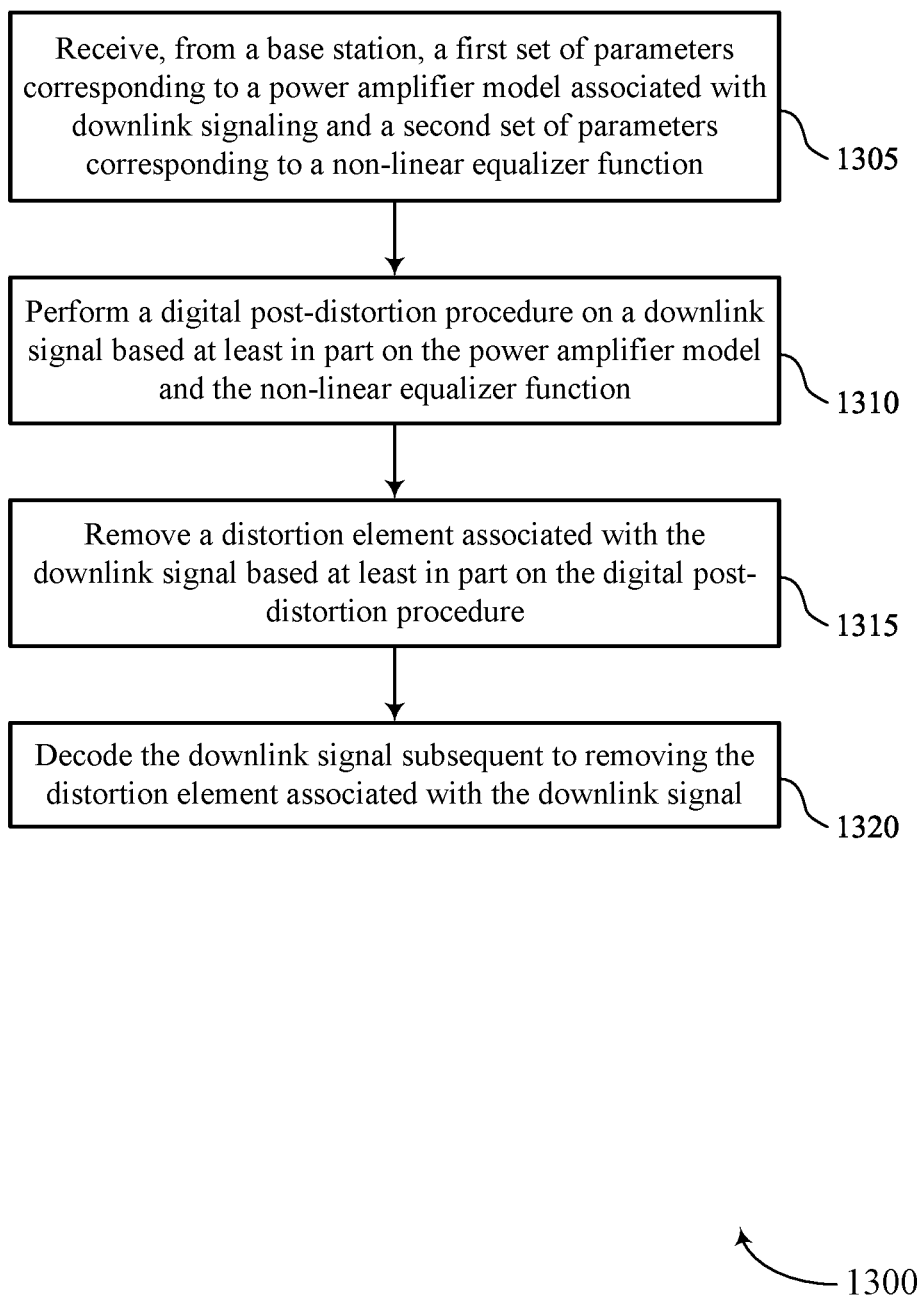
FIGS. 13 through 16 show flowcharts illustrating methods that support high order DPoD procedures in accordance with aspects of the present disclosure.

FIG. 13 shows a flowchart illustrating a method 1300 that supports high order DPoD procedures in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a base station, a first set of parameters corresponding to a power amplifier model associated with downlink signaling and a second set of parameters corresponding to a non-linear equalizer function. The operations of 1305 may be performed in accordance with examples as disclosed herein. In some examples, aspects of the operations of 1305 may be performed by a parameter manager 725 as described with reference to FIG. 7.

At 1310, the method may include performing a DPoD procedure on a downlink signal based on the power amplifier model and the non-linear equalizer function. The operations of 1310 may be performed in accordance with examples as disclosed herein. In some examples, aspects of the operations of 1310 may be performed by a DPoD manager 730 as described with reference to FIG. 7.

At 1315, the method may include removing a distortion element associated with the downlink signal based on the DPoD procedure. The operations of 1315 may be performed in accordance with examples as disclosed herein. In some examples, aspects of the operations of 1315 may be performed by a distortion element manager 735 as described with reference to FIG. 7.

At 1320, the method may include decoding the downlink signal subsequent to removing the distortion element associated with the downlink signal. The operations of 1320 may be performed in accordance with examples as disclosed herein. In some examples, aspects of the operations of 1320 may be performed by a decoding manager 740 as described with reference to FIG. 7.

Figure 14:
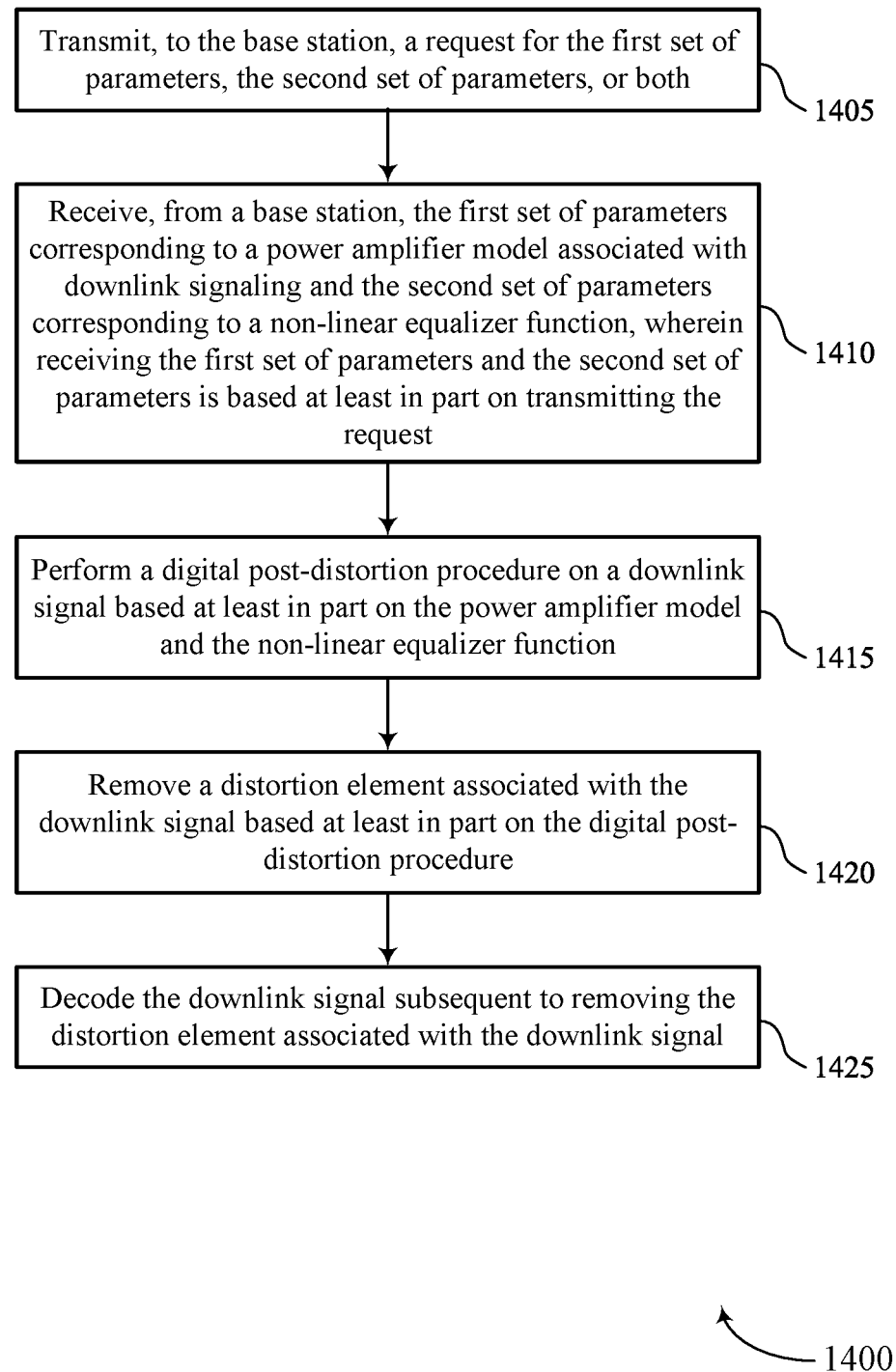

FIG. 14 shows a flowchart illustrating a method 1400 that supports high order DPoD procedures in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting, to the base station, a request for a first set of parameters, a second set of parameters, or both, where receiving the first set of parameters and the second set of parameters is based on transmitting the request. The operations of 1405 may be performed in accordance with examples as disclosed herein. In some examples, aspects of the operations of 1405 may be performed by a parameter request manager 755 as described with reference to FIG. 7.

At 1410, the method may include receiving, from a base station, a first set of parameters corresponding to a power amplifier model associated with downlink signaling and a second set of parameters corresponding to a non-linear equalizer function. The operations of 1410 may be performed in accordance with examples as disclosed herein. In some examples, aspects of the operations of 1410 may be performed by a parameter manager 725 as described with reference to FIG. 7.

At 1415, the method may include performing a DPoD procedure on a downlink signal based on the power amplifier model and the non-linear equalizer function. The operations of 1415 may be performed in accordance with examples as disclosed herein. In some examples, aspects of the operations of 1415 may be performed by a DPoD manager 730 as described with reference to FIG. 7.

At 1420, the method may include removing a distortion element associated with the downlink signal based on the DPoD procedure. The operations of 1420 may be performed in accordance with examples as disclosed herein. In some examples, aspects of the operations of 1420 may be performed by a distortion element manager 735 as described with reference to FIG. 7.

At 1425, the method may include decoding the downlink signal subsequent to removing the distortion element associated with the downlink signal. The operations of 1425 may be performed in accordance with examples as disclosed herein. In some examples, aspects of the operations of 1425 may be performed by a decoding manager 740 as described with reference to FIG. 7.

Figure 15:
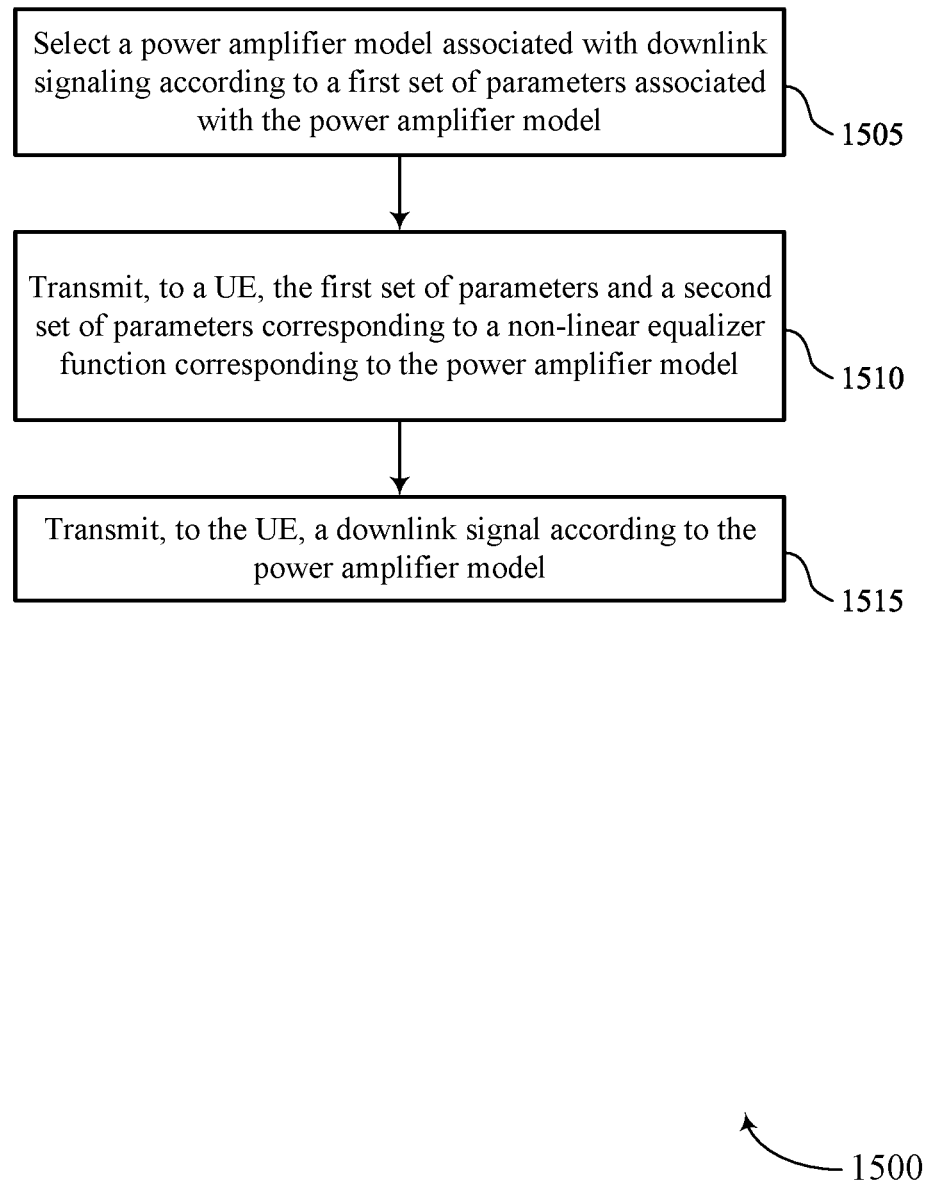

FIG. 15 shows a flowchart illustrating a method 1500 that supports high order DPoD procedures in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally, or alternatively, the base station may perform aspects of the described functions using special-purpose hardware.

At 1505, the method may include selecting a power amplifier model associated with downlink signaling according to a first set of parameters associated with the power amplifier model. The operations of 1505 may be performed in accordance with examples as disclosed herein. In some examples, aspects of the operations of 1505 may be performed by a power amplifier model selection manager 1125 as described with reference to FIG. 11.

At 1510, the method may include transmitting, to a UE, the first set of parameters and a second set of parameters corresponding to a non-linear equalizer function corresponding to the power amplifier model. The operations of 1510 may be performed in accordance with examples as disclosed herein. In some examples, aspects of the operations of 1510 may be performed by a parameter manager 1130 as described with reference to FIG. 11.

At 1515, the method may include transmitting, to the UE, a downlink signal according to the power amplifier model. The operations of 1515 may be performed in accordance with examples as disclosed herein. In some examples, aspects of the operations of 1515 may be performed by a downlink signaling manager 1135 as described with reference to FIG. 11.

Figure 16:
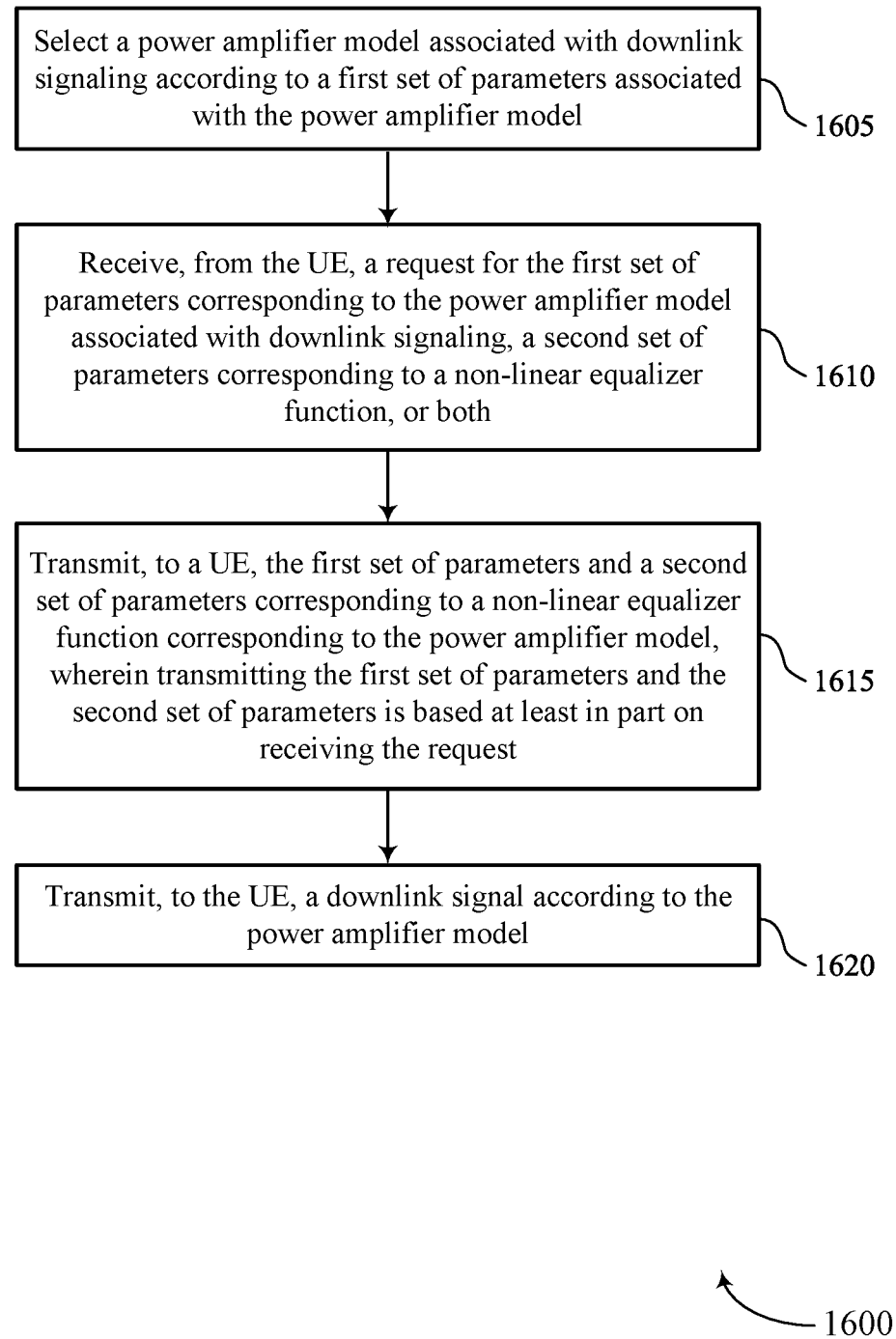

FIG. 16 shows a flowchart illustrating a method 1600 that supports high order DPoD procedures in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally, or alternatively, the base station may perform aspects of the described functions using special-purpose hardware.

At 1605, the method may include selecting a power amplifier model associated with downlink signaling according to a first set of parameters associated with the power amplifier model. The operations of 1605 may be performed in accordance with examples as disclosed herein. In some examples, aspects of the operations of 1605 may be performed by a power amplifier model selection manager 1125 as described with reference to FIG. 11.

At 1610, the method may include receiving, from the UE, a request for the first set of parameters corresponding to the power amplifier model associated with downlink signaling, a second set of parameters corresponding to a non-linear equalizer function, or both. The operations of 1610 may be performed in accordance with examples as disclosed herein. In some examples, aspects of the operations of 1610 may be performed by a parameter request manager 1155 as described with reference to FIG. 11.

At 1615, the method may include transmitting, to a UE, the first set of parameters and a second set of parameters corresponding to a non-linear equalizer function corresponding to the power amplifier model, wherein transmitting the first set of parameters and the second set of parameters is based at least in part on receiving the request. The operations of 1615 may be performed in accordance with examples as disclosed herein. In some examples, aspects of the operations of 1615 may be performed by a parameter manager 1130 as described with reference to FIG. 11.

At 1620, the method may include transmitting, to the UE, a downlink signal according to the power amplifier model. The operations of 1620 may be performed in accordance with examples as disclosed herein. In some examples, aspects of the operations of 1620 may be performed by a downlink signaling manager 1135 as described with reference to FIG. 11.

The following provides an overview of aspects of the present disclosure:

Aspect 1: A method for wireless communications at a UE, comprising: receiving, from a base station, a first set of parameters corresponding to a power amplifier model associated with downlink signaling and a second set of parameters corresponding to a non-linear equalizer function; performing a DPoD procedure on a downlink signal based at least in part on the power amplifier model and the non-linear equalizer function; removing a distortion element associated with the downlink signal based at least in part on the DPoD procedure; and decoding the downlink signal subsequent to removing the distortion element associated with the downlink signal.

Aspect 2: The method of aspect 1, wherein receiving the first set of parameters corresponding to the power amplifier model comprises: receiving an indication of the power amplifier model used by the base station to transmit the downlink signal.

Aspect 3: The method of any of aspects 1 through 2, wherein receiving the first set of parameters corresponding to the power amplifier model comprises: receiving an indication of a set of kernels for the power amplifier model.

Aspect 4: The method of aspect 3, further comprising: receiving, from the base station, a set of pilot signals allocated for estimating power amplifier models, non-linear equalizer functions, or both; and estimating a set of coefficients for the power amplifier model based at least in part on receiving the set of pilot signals and the set of kernels.

Aspect 5: The method of any of aspects 1 through 4, wherein receiving the first set of parameters corresponding to the power amplifier model comprises: receiving an indication of a set of kernels for the power amplifier model and a set of coefficients for the power amplifier model.

Aspect 6: The method of any of aspects 1 through 5, wherein receiving the first set of parameters corresponding to the power amplifier model comprises: receiving an indication of a vector of lookup tables comprising an indication of the power amplifier model.

Aspect 7: The method of any of aspects 1 through 6, wherein receiving the second set of parameters corresponding to the non-linear equalizer function comprises: receiving an indication of a model for the non-linear equalizer function.

Aspect 8: The method of any of aspects 1 through 7, wherein receiving the second set of parameters corresponding to the non-linear equalizer function comprises: receiving an indication of a set of kernels for the non-linear equalizer function.

Aspect 9: The method of aspect 8, further comprising: receiving, from the base station, a set of pilot signals allocated for estimating power amplifier models, non-linear equalizer functions, or both; and estimating a set of coefficients for the non-linear equalizer function based at least in part on receiving the set of pilot signals and the set of kernels.

Aspect 10: The method of any of aspects 1 through 9, wherein receiving the second set of parameters corresponding to the non-linear equalizer function comprises: receiving an indication of a set of kernels for the non-linear equalizer function and a set of coefficients for the non-linear equalizer function.

Aspect 11: The method of any of aspects 1 through 10, further comprising: transmitting, to the base station, a request for the first set of parameters, the second set of parameters, or both, wherein receiving the first set of parameters and the second set of parameters is based at least in part on transmitting the request.

Aspect 12: The method of any of aspects 1 through 11, further comprising: receiving, from the base station, higher layer signaling comprising a lookup table associating a set of indices with respective parameters corresponding to the power amplifier model, respective parameters corresponding to the non-linear equalizer function, or both.

Aspect 13: The method of aspect 12, wherein receiving the first set of parameters corresponding to the power amplifier model associated with downlink signaling and the second set of parameters corresponding to the non-linear equalizer function comprises: receiving an index of the set of indices identifying the first set of parameters corresponding to the power amplifier model associated with downlink signaling, the second set of parameters corresponding to a non-linear equalizer function, or both, via the lookup table.

Aspect 14: A method for wireless communications at a base station, comprising: selecting a power amplifier model associated with downlink signaling according to a first set of parameters associated with the power amplifier model; transmitting, to a UE, the first set of parameters and a second set of parameters corresponding to a non-linear equalizer function corresponding to the power amplifier model; and transmitting, to the UE, a downlink signal according to the power amplifier model.

Aspect 15: The method of aspect 14, wherein transmitting the first set of parameters corresponding to the power amplifier model comprises: transmitting an indication of the power amplifier model used by the base station to transmit the downlink signal.

Aspect 16: The method of any of aspects 14 through 15, wherein transmitting the first set of parameters corresponding to the power amplifier model comprises: transmitting an indication of a set of kernels for the power amplifier model.

Aspect 17: The method of any of aspects 14 through 16, wherein transmitting the first set of parameters corresponding to the power amplifier model comprises: transmitting an indication of a set of kernels for the power amplifier model and a set of coefficients for the power amplifier model.

Aspect 18: The method of any of aspects 14 through 17, wherein transmitting the first set of parameters corresponding to the power amplifier model comprises: transmitting an indication of a vector of lookup tables comprising an indication of the power amplifier model.

Aspect 19: The method of any of aspects 14 through 18, further comprising: transmitting, to the UE, a set of pilot signals allocated for estimating power amplifier models, non-linear equalizer functions, or both.

Aspect 20: The method of any of aspects 14 through 19, wherein transmitting the second set of parameters corresponding to the non-linear equalizer function comprises: transmitting an indication of a model for the non-linear equalizer function.

Aspect 21: The method of any of aspects 14 through 20, wherein transmitting the second set of parameters corresponding to the non-linear equalizer function comprises: transmitting an indication of a set of kernels for the non-linear equalizer function.

Aspect 22: The method of any of aspects 14 through 21, wherein transmitting the second set of parameters corresponding to the non-linear equalizer function comprises: transmitting an indication of a set of kernels for the non-linear equalizer function and a set of coefficients for the non-linear equalizer function.

Aspect 23: The method of any of aspects 14 through 22, further comprising: receiving, from the UE, a request for the first set of parameters corresponding to the power amplifier model associated with downlink signaling, the second set of parameters corresponding to a non-linear equalizer function, or both, wherein transmitting the first set of parameters and the second set of parameters is based at least in part on receiving the request.

Aspect 24: The method of any of aspects 14 through 23, further comprising: transmitting, to the UE, higher layer signaling comprising a lookup table associating a set of indices with respective parameters corresponding to the power amplifier model, parameters corresponding to a non-linear equalizer function, or both.

Aspect 25: The method of aspect 24, wherein transmitting the first set of parameters corresponding to the power amplifier model associated with downlink signaling and the second set of parameters corresponding to the non-linear equalizer function comprises: transmitting an index of the set of indices identifying the first set of parameters corresponding to the power amplifier model associated with downlink signaling, the second set of parameters corresponding to a non-linear equalizer function, or both, via the lookup table.

Aspect 26: The method of any of aspects 14 through 25, wherein selecting the power amplifier model comprises: detecting a change in temperature, a beam change, or both; and switching from a previous power amplifier model to the power amplifier model based at least in part on the detecting.

Aspect 27: An apparatus for wireless communications at a UE, comprising a processor; memory coupled with the processor; and instructions stored in the memory and executable by the processor to cause the apparatus to perform a method of any of aspects 1 through 13.

Aspect 28: An apparatus for wireless communications at a UE, comprising at least one means for performing a method of any of aspects 1 through 13.

Aspect 29: A non-transitory computer-readable medium storing code for wireless communications at a UE, the code comprising instructions executable by a processor to perform a method of any of aspects 1 through 13.

Aspect 30: An apparatus for wireless communications at a base station, comprising a processor; memory coupled with the processor; and instructions stored in the memory and executable by the processor to cause the apparatus to perform a method of any of aspects 14 through 26.

Aspect 31: An apparatus for wireless communications at a base station, comprising at least one means for performing a method of any of aspects 14 through 26.

Aspect 32: A non-transitory computer-readable medium storing code for wireless communications at a base station, the code comprising instructions executable by a processor to perform a method of any of aspects 14 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a base station, a first set of parameters corresponding to a power amplifier model associated with downlink signaling and a second set of parameters corresponding to a non-linear equalizer function;
   receiving, from the base station, signaling comprising information associating a set of indices with respective parameters corresponding to the power amplifier model, respective parameters corresponding to the non-linear equalizer function, or both;
   performing a digital post-distortion procedure on a downlink signal based at least in part on the first set of parameters corresponding to the power amplifier model and the second set of parameters corresponding to the non-linear equalizer function;
   removing a distortion element associated with the downlink signal based at least in part on the digital post-distortion procedure; and
   decoding the downlink signal subsequent to removing the distortion element associated with the downlink signal.

2. The method of claim 1, wherein receiving the first set of parameters corresponding to the power amplifier model comprises:
   receiving an indication of the power amplifier model used by the base station to transmit the downlink signal.

3. The method of claim 1, wherein receiving the first set of parameters corresponding to the power amplifier model comprises:
   receiving an indication of a set of kernels for the power amplifier model.

4. The method of claim 3, further comprising:
receiving, from the base station, a set of pilot signals allocated for estimating power amplifier models, non-linear equalizer functions, or both; and
estimating a set of coefficients for the power amplifier model based at least in part on receiving the set of pilot signals and the set of kernels.

5. The method of claim 1, wherein receiving the first set of parameters corresponding to the power amplifier model comprises:
receiving an indication of a set of kernels for the power amplifier model and a set of coefficients for the power amplifier model.

6. The method of claim 1, wherein receiving the first set of parameters corresponding to the power amplifier model comprises:
receiving an indication of a vector of lookup tables comprising an indication of the power amplifier model.

7. The method of claim 1, wherein receiving the second set of parameters corresponding to the non-linear equalizer function comprises:
receiving an indication of a model for the non-linear equalizer function.

8. The method of claim 1, wherein receiving the second set of parameters corresponding to the non-linear equalizer function comprises:
receiving an indication of a set of kernels for the non-linear equalizer function.

9. The method of claim 8, further comprising:
receiving, from the base station, a set of pilot signals allocated for estimating power amplifier models, non-linear equalizer functions, or both; and
estimating a set of coefficients for the non-linear equalizer function based at least in part on receiving the set of pilot signals and the set of kernels.

10. The method of claim 1, wherein receiving the second set of parameters corresponding to the non-linear equalizer function comprises:
receiving an indication of a set of kernels for the non-linear equalizer function and a set of coefficients for the non-linear equalizer function.

11. The method of claim 1, further comprising:
transmitting, to the base station, a request for the first set of parameters, the second set of parameters, or both, wherein receiving the first set of parameters and the second set of parameters is based at least in part on transmitting the request.

12. The method of claim 1,
wherein the signaling comprises higher layer signaling, and wherein the information comprises a lookup table associating the set of indices with respective parameters corresponding to the power amplifier model, respective parameters corresponding to the non-linear equalizer function, or both.

13. The method of claim 1, wherein receiving the first set of parameters corresponding to the power amplifier model associated with downlink signaling and the second set of parameters corresponding to the non-linear equalizer function comprises:
receiving an index of the set of indices identifying the first set of parameters corresponding to the power amplifier model associated with downlink signaling, the second set of parameters corresponding to a non-linear equalizer function, or both, via a lookup table.

14. A method for wireless communications at a base station, comprising:
selecting a power amplifier model associated with downlink signaling according to a first set of parameters associated with the power amplifier model;
transmitting, to a user equipment (UE), the first set of parameters and a second set of parameters corresponding to a non-linear equalizer function;
transmitting, to the UE, signaling comprising information associating a set of indices with respective parameters corresponding to the power amplifier model, parameters corresponding to a non-linear equalizer function, or both; and
transmitting, to the UE, a downlink signal according to the first set of parameters associated with the power amplifier model.

15. The method of claim 14, wherein transmitting the first set of parameters corresponding to the power amplifier model comprises:
transmitting an indication of the power amplifier model used by the base station to transmit the downlink signal.

16. The method of claim 14, wherein transmitting the first set of parameters corresponding to the power amplifier model comprises:
transmitting an indication of a set of kernels for the power amplifier model.

17. The method of claim 14, wherein transmitting the first set of parameters corresponding to the power amplifier model comprises:
transmitting an indication of a set of kernels for the power amplifier model and a set of coefficients for the power amplifier model.

18. The method of claim 14, wherein transmitting the first set of parameters corresponding to the power amplifier model comprises:
transmitting an indication of a vector of lookup tables comprising an indication of the power amplifier model.

19. The method of claim 14, further comprising:
transmitting, to the UE, a set of pilot signals allocated for estimating power amplifier models, non-linear equalizer functions, or both.

20. The method of claim 14, wherein transmitting the second set of parameters corresponding to the non-linear equalizer function comprises:
transmitting an indication of a model for the non-linear equalizer function.

21. The method of claim 14, wherein transmitting the second set of parameters corresponding to the non-linear equalizer function comprises:
transmitting an indication of a set of kernels for the non-linear equalizer function.

22. The method of claim 14, wherein transmitting the second set of parameters corresponding to the non-linear equalizer function comprises:
transmitting an indication of a set of kernels for the non-linear equalizer function and a set of coefficients for the non-linear equalizer function.

23. The method of claim 14, further comprising:
receiving, from the UE, a request for the first set of parameters corresponding to the power amplifier model associated with downlink signaling, the second set of parameters corresponding to a non-linear equalizer function, or both, wherein transmitting the first set of parameters and the second set of parameters is based at least in part on receiving the request.

24. The method of claim 14,
wherein the signaling comprises higher layer signaling, and wherein the information comprises a lookup table associating the set of indices with respective parameters corresponding to the power amplifier model, parameters corresponding to a non-linear equalizer function, or both.

25. The method of claim 14, wherein transmitting the first set of parameters corresponding to the power amplifier model associated with downlink signaling and the second set of parameters corresponding to the non-linear equalizer function comprises:
transmitting an index of the set of indices identifying the first set of parameters corresponding to the power amplifier model associated with downlink signaling, the second set of parameters corresponding to a non-linear equalizer function, or both, via a lookup table.

26. The method of claim 14, wherein selecting the power amplifier model comprises:
detecting a change in temperature, a beam change, or both; and
switching from a previous power amplifier model to the power amplifier model based at least in part on the detecting.

27. An apparatus for wireless communications at a user equipment (UE), comprising:
memory; and
one or more processors coupled with the memory and configured to cause the apparatus to:
receive, from a base station, a first set of parameters corresponding to a power amplifier model associated with downlink signaling and a second set of parameters corresponding to a non-linear equalizer function;
receiving, from the base station, signaling comprising information associating a set of indices with respective parameters corresponding to the power amplifier model, respective parameters corresponding to the non-linear equalizer function, or both;
perform a digital post-distortion procedure on a downlink signal based at least in part on the first set of parameters corresponding to the power amplifier model and the second set of parameters corresponding to the non-linear equalizer function;
remove a distortion element associated with the downlink signal based at least in part on the digital post-distortion procedure; and
decode the downlink signal subsequent to removing the distortion element associated with the downlink signal.

28. The apparatus of claim 27, wherein the one or more processors are individually or collectively configured to cause the apparatus to:
transmit, to the base station, a request for the first set of parameters, the second set of parameters, or both, wherein receiving the first set of parameters and the second set of parameters is based at least in part on transmitting the request.

29. An apparatus for wireless communications at a base station, comprising:
memory; and
one or more processors coupled with the memory and configured to cause the apparatus to:
select a power amplifier model associated with downlink signaling according to a first set of parameters associated with the power amplifier model;
transmit, to a user equipment (UE), the first set of parameters and a second set of parameters corresponding to a non-linear equalizer function;
transmitting, to the UE, signaling comprising information associating a set of indices with respective parameters corresponding to the power amplifier model, parameters corresponding to a non-linear equalizer function, or both; and
transmit, to the UE, a downlink signal according to the first set of parameters associated with the power amplifier model.

30. The apparatus of claim 29, wherein the one or more processors are individually or collectively configured to cause the apparatus to:
receive, from the UE, a request for the first set of parameters corresponding to the power amplifier model associated with downlink signaling, the second set of parameters corresponding to a non-linear equalizer function, or both, wherein transmitting the first set of parameters and the second set of parameters is based at least in part on receiving the request.

31. The method of claim 1, further comprising:
updating the power amplifier model according to the first set of parameters; and
updating the non-linear equalizer function according to the second set of parameters, wherein performing the digital post-distortion procedure on the downlink signal is based at least in part on updating the power amplifier model and updating the non-linear equalizer function.

* * * * *